(12) United States Patent
Gotoh

(10) Patent No.: US 6,719,459 B1
(45) Date of Patent: Apr. 13, 2004

(54) BALL BEARING

(75) Inventor: Fusasuke Gotoh, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/691,457

(22) Filed: Oct. 18, 2000

(30) Foreign Application Priority Data

Oct. 18, 1999 (JP) ......................... H11-295823
Nov. 16, 1999 (JP) ......................... H11-325301
Dec. 28, 1999 (JP) ......................... H11-374986

(51) Int. Cl.$^7$ ............................................. F16C 33/78
(52) U.S. Cl. ..................... 384/482; 384/484; 384/526; 384/531
(58) Field of Search ................. 384/477, 479, 384/480, 481, 482, 484, 485, 486, 523, 526, 528, 530, 531, 532, 533, 534

(56) References Cited

U.S. PATENT DOCUMENTS 3,642,335 A * 2/1972 Takahashi et al. .......... 384/482
5,037,213 A * 8/1991 Uchida et al. .............. 384/482

FOREIGN PATENT DOCUMENTS

| JP | 58-195118 | 12/1983 |
|---|---|---|
| JP | 5-73318 | 10/1993 |
| JP | 6-27859 | 7/1994 |
| JP | 6-73454 | 10/1994 |
| JP | 7-10556 | 2/1995 |
| JP | 7-139553 | 5/1995 |
| JP | 7-293571 | 11/1995 |
| JP | 8-177865 | 7/1996 |
| JP | 8-226449 | 9/1996 |
| JP | 8-270662 | 10/1996 |
| JP | 8-338434 | * 12/1996 |
| JP | 9-158951 | 6/1997 |
| JP | 9-303402 | 11/1997 |
| JP | 10-82424 | 3/1998 |
| JP | 11-201169 | 7/1999 |

* cited by examiner

Primary Examiner—William C. Joyce
(74) Attorney, Agent, or Firm—Katten Muchin Zavis Rosenman

(57) ABSTRACT

A retainer for a ball bearing formed in a generally annular shape and having a plurality of pockets arranged in a circumferential direction, respectively, to rollably hold a plurality of balls along a pitch circle, respectively, the pockets each having an inner peripheral surface comprising a radially inner section which is located inward of the pitch circle of the balls in the radial direction of the retainer, and has an inner diameter larger than the diameter of the balls, such that the gap between the radially inner section of the inner peripheral surface of the pockets and the rolling surface of the balls gradually increases toward the opening of the pockets on the inner side in the radial direction of the retainer, and that the maximum inscribing circle of the opening of the pockets on the outer side in the radial direction of the retainer has a diameter smaller than the diameter of the balls.

1 Claim, 32 Drawing Sheets

BALL BEARING

TECHNICAL FIELD OF THE INVENTION

This invention relate to a ball-bearing retainer (also referred to as cage) and ball bearing, particularly to an improvement of ball bearings used in various rotating mechanical devices and the retainers used in those ball bearings, and more particularly to providing inexpensively a structure to prevent lubrication grease enclosed inside the ball-bearing from leaking out, while at the same time makes it possible to suppress the generation of harmful noise called retainer noise.

BACKGROUND OF THE INVENTION

Ball bearings, such as the ball bearing 1 shown in FIG. 1, are widely used for supporting various rotating parts, such as the bearings of various rotating mechanical devices. This ball bearing 1 comprises an inner race 3, that has a inner-race track (also referred to as raceway) 2 formed around its outer peripheral surface, an outer race 5, that has an outer-race track 4 formed around its inner peripheral surface, which are located such that they are concentric, and a plurality of balls 6 that are located between the inner-race track 2 and outer-race track 4 such that they can rotate freely. In the example shown in the figure, the inner-race track 2 and outer-race track 4 are both formed in a deep groove shape in addition, the plurality of balls 6 are held in pockets 8 that are formed in the retainer 7 such that they can rotate freely.

The retainer 7 of the ball bearing 1 shown in FIG. 1 is called a wave-shaped pressed retainer, and is formed by combining a pair of elements 9 that are obtained by pressing a some kind of metal sheet material into a wave-shaped circular ring. Both of these elements 9 are formed with concave sections 10 that form pockets 8 at a plurality of locations around in the circumferential direction.

This pair of elements 9 come together at sections that are separated from the concave sections 10 and are joined and fastened together by a plurality of rivets 11 at these sections to form the retainer 7 which is ring shaped and has the pockets 8 around in the circumferential direction.

The middle section on the inside surface of the concave sections 10 has a radius of curvature that is slightly larger than the radius of curvature of the outside surface or rolling surface of the balls 6, and forms a partial spherical and concave retaining surface 12. Therefore, when the pair of elements 9 come together, the concave sections 10 come together to form the pockets 8.

The retainer 7 shown in FIG. 2, called a crown-shaped retainer, comprises a ring-shaped main section 13 that is made of synthetic resin, in which pockets 8 are formed at a plurality of locations around in the circumferential direction for holding the balls 6 such that they can rotate freely. In the case of this kind of crown-shaped retainer 7, a plurality of elastic pieces 14 are arranged around the main section 13 such that there is a space between them, and the pockets 8 each is defined by the opposing side surfaces of a pair of elastic pieces 14 and a spherical-shaped concave section 15 that is formed between the pair of elastic pieces 14 on the surface on one side (top surface in FIG. 2) in the axial direction (vertical direction in FIG. 2) of the main section 13.

The radius of curvature of this concave section 15 is slightly larger than the radius of curvature of the outer surface of the balls 6. The side surfaces of the elastic pieces 14 and the concave section 15 form a concave retaining surface.

When assembling the ball bearing, the balls 6 are inserted in between the pair of elastic pieces 14 by elastically pressing open the space between the tip ends of the pair of plastic pieces 14. As soon as balls 6 have been pressed into place, the elastic pieces 14 elastically return to their original shape to hold the balls 6 inside the pockets 8, and these balls 6 are then held between the inner-race track 2 and outer-race track 4 (see FIG. 1) such that they rotate freely.

When using a ball bearing 1 equipped with the retainer 7 described above, the inner race 3 rotates freely with respect to the outer race 5 due to the rolling motion of the balls 6. At this time, the balls 6 revolve around the inner race 3 as they rotate. Moreover, the retainer 7 rotates around the inner race 3 at the same speed that the balls 6 revolve around the inner race 3.

Grease is filled in the section between the outer peripheral surface of the inner race 3 and the inner peripheral surface of the outer race 5 in order that they rotate smoothly with respect to each other. Also, together with preventing the generation of vibration or noise in the ball bearing 1, the grease prevents trouble due to seizure etc. It is not shown in FIG. 1, however the openings on both ends in the axial direction of space 16 where the balls 6 are located between the outer peripheral surface of the inner race 3 and the inner peripheral surface of the outer race 5 are covered by a pair of seal plates 17 of the contact type as shown in FIG. 6, or of the non-contact type, and these seal plates 7 prevent grease from leaking from the space 16 as well as prevent foreign matter such as dirt from getting inside the space 16.

The outer peripheral edges of the seal plates 17 fit into seal grooves all the way around the inner peripheral surface on both ends of the outer race 5, and the inner peripheral edges come in contact with or come very close to the outer peripheral surface on both ends of the inner race 3.

In the case of the ball bearing 1 with a retainer 7 as described above, vibration of the retainer 7 may be caused even when the ball bearing 1 is filled with or supplied with the required amount of lubricant, so noise or vibration, called 'retainer noise' may occur in the ball bearing 1 with this retainer 7. The vibration of this kind of retainer 7 is due to large movement of the retainer 7 with respect to the balls 6, which is caused by the sliding friction between the balls 6 and the retainer 7.

Conventionally, generation of this kind of retainer noise was suppressed by making the gap between the inner surface of the pockets 8 and the rolling surface of the balls 6 smaller in order to reduce the amount of movement of the retainer 7 with respect to the balls 6.

However, by just reducing the amount of movement of the retainer 7 with respect to the balls 6, the grease 20 (see FIG. 5 and FIG. 6) filled in the space 16 where the balls 6 are located presses against the seal plate 17 from inside the space 16, making it easy for the grease to leak out. Also, it becomes easy for retainer noise due to the shape of the inner peripheral surface of the pockets 8 to occur. The reason for this is explained using FIG. 3 and FIG. 4.

In the case of the retainer 7 in the prior art structure, nearly the entire inner peripheral surface of the pockets 8 of the retainer 7 is a spherical concave shape having a radius of curvature that is slightly larger than the radius of curvature of the rolling surface (also referred to as rolling contact surface) of the balls 6. Also, the edge 18 on the opening of the pockets 8 comes very close to the rolling surface of the balls 6, as shown in FIGS. 3 and 4.

Moreover, by making the gap between the inner surface of the pockets 8 and the rolling surface of the balls 6 smaller in order to suppress the retainer noise, it becomes difficult for the grease 20 to enter the clearance 19 between the rolling surface of the balls 6 and the concave surface 12 of the retainer 7 (in the case shown in FIG. 1), or between the rolling surface of the balls 6 and the side surfaces of the elastic pieces 14 and the concave section 15 (in the case of the retainer 7 shown in FIG. 2).

In other words, the grease 20, that adheres to the rolling surface of the balls 6 and that tries to get into this clearance 19 from the surrounding space as the balls 6 roll, is scraped off by the edges 18 on the openings of the pockets 8, and as shown by dotted areas in FIGS. 5 and 6, adheres to the edges 18 on the openings. The grease 20 that adheres to the edges 18 of the openings in this way builds up on the edges 18 of the openings as the balls 6 roll, making it difficult for grease 20 to get into the clearance 19.

Also, of the grease 20 that builds up on the edges 18 of the openings in this way, the grease 20 that builds up on the inner peripheral surface of the retainer 7 presses the inner peripheral edges of the seal plates 17 from inside the space 16, and separates the inner peripheral edges of the seal plates 17 from the outer peripheral surface on both ends; of the inner race 3 (in the case of the contact-type seal plate) to leak out of the space 16, or leaks out of the space 16 through the small gap that exists between the inner peripheral edges of the seal plates 17 and the outer peripheral surface on both ends of the inner race 3 (for a non-contact-type seal plate). Therefore, over a long period of use, the amount of grease 20 that remains in this space 16 gradually decreases, and there is a possibility that abnormal wear or seizure will occur due to poor lubrication.

Leakage of grease 20, that is the cause of problems such as these, is more severe during use when the inner race 3 is still and the outer race 5 is rotated, than when the outer race 5 is still and the inner race 3 is rotated. The reason for this is, that when the outer race 5 is rotated, the grease 20 that has reached the inner peripheral surface of the outer race 5 is easily fed to the outer-race track 4 by the centrifugal force, and when in this area of the outer-race track 4, the grease 20 adheres to the rolling track surface of the balls 6 (which is the part of the rolling surface of the balls 6 that makes rolling contact with the inner-race track 2 and outer-race track 4) to easily move radially inward within the retainer 7.

Since a substantial amount of the grease 20 that adhered to the rolling surface of the balls 6 adheres to the edge 18 of the opening, it becomes difficult for the grease 20 to get inside the clearance 19, so that it becomes impossible to adequately suppress friction and vibration in the area of sliding contact between the retainer 7 and the balls 6, thus vibration and noise occurs.

Construction of a ball bearing in which the grease, that adheres to the inner peripheral surface of the retainer, is directed to the outer peripheral surface of the retainer, thereby preventing leakage of the grease from the inner peripheral edge of the seal plates has been known, such as disclosed in Japanese Patent Publications Toku Kai Hei 8-270662 and Jitsu Kai Hei 7-10556.

Of these, in the construction disclosed in Toku Kai Hei 8-270662, part of the seal lip of the seal plate, made of elastic material, comes close to the outer peripheral surface of the inner race, and is formed to protrude to the ball side, making a protruding section, so that the grease, that adheres to the inner peripheral surface of the retainer, is directed to the outer peripheral surface of the retainer. Also, in the construction disclosed in Jitsu Kai Hei 7-10556, the grease that adheres to the inner peripheral surface of the retainer is directed to the outer peripheral surface of the retainer by a slinger that fixedly fits around the outer peripheral surface of the inner race.

Furthermore, construction in which there is a seal lip on the inner peripheral edge of the seal plate that comes in contact with the outer peripheral surface of the inner race at multiple locations, or in which there is a multi-stage labyrinth seal between the inner peripheral edge of the seal plate and the outer peripheral surface of the inner race is known. With this prior construction, it is difficult for the grease that adheres to the inner peripheral surface of the retainer to leak out.

Of the prior art constructions mentioned above, in the case of the construction disclosed in Publication of Toku Kai Hei 8-270662, the inner peripheral surface of the protruding section closely faces the outer peripheral surface of the inner race, so it is necessary to strictly regulate the accuracy of the dimensions between the seal plate and the inner race. Particularly, it is necessary to perform finishing such as polishing to the section on both ends of the outer peripheral surface of the inner race that is separated from the inner-race track, which was not necessary originally, so that the manufacturing cost increases. Also, the size of the ball bearing to which this can be applied is limited, and it is difficult to apply the construction to a small-diameter ball bearing, or to a ball bearing that is thin in the axial direction.

Moreover, in the case of the construction disclosed in Publication of Jitsu Kai Hei 7-10556, a separate part or slinger is required just in order to direct the grease to the outside, so that the number of parts increases as well as the number of assembly steps, thus increasing the manufacturing cost. Also, as in the case of the construction disclosed in Publication of Toku Kai Hei 8-270662, the size of the ball bearing to which it can be applied is limited, and it is difficult to apply the construction to a small-diameter ball bearing, or to a ball bearing that is thin in the axial direction.

Furthermore, in the case of the construction of forming a plurality of sliding contact sections, or of forming a multi-staged labyrinth seal, not only does the rotation torque of the ball bearing increase and the heat generated during high-speed operation become severe, but in many cases it is not possible to sufficiently obtain the effect of leak prevention.

Rolling bearings, such as the rolling bearing 1 with seal plate as shown in FIGS. 7 and 8, are used for rotation support of various kinds of mechanical equipment. This rolling bearing 1 with seal plate comprises: an inner race 3 with an inner-race track 2 formed around its outer peripheral surface; an outer race 5, which is concentric with the inner race 3 and that has an outer-race track 4 formed around its inner peripheral surface; and a plurality of rolling element 6 that roll freely between the inner-race track 2 and the outer-race track 4. The plurality of rolling elements 6 are held by a retainer (not shown in the figures) such that they can roll freely. In addition, the outer peripheral edges of seal plates 108 fit in seal grooves 107 that are formed all the way around the inner peripheral surface on both ends of the outer race 5.

These seal plates 108 are formed into a ring shape by reinforcing an elastic member 110 made of an rubber-like elastomer, with a ring-shaped core metal 109 that is made from metal plate such as steel plate. The outer peripheral edge of the elastic member 110 protrudes outward in the radial direction (vertical direction in FIGS. 7 and 8) a little more than the outer peripheral edge of the core metal 109, and this protruding section fits into the seal grooves 107. On the other hand, the inner peripheral edge of the elastic member 110 protrudes sufficiently inward in the radial direction more than the inner peripheral edge of the core 109 to form a seal lip 111.

Moreover, a pair of wall surfaces 114, 115 are formed in the outer peripheral surface on both ends of the inner race 3 to form a seal groove 113, and the end edge 112 of the seal lip 111 comes in contact with the wall surface 115, which is on the inside in axial direction (horizontal direction in FIGS. 7 and 8) with respect to the pair of wall surfaces 114, 115.

In the example shown in the figures, the free state of the elastic member 110 is shown by the solid line, and the state when the seal lip 111 is elastically deformed to come in contact with the wall surface 115 is shown by the dotted line.

The rolling bearing 1 with seal plate, constructed as described above, allows the member attached to the inner race 3 to rotate with respect to the member attached to the outer race 5, due to the rolling of the rolling elements 6. Also, the pair of seal plates 108, whose outer peripheral edges are attached to the inner peripheral surface on both ends of the outer race 5, prevent the grease, filled in the space 16 where the rolling elements 6 are located, from leaking out, and also prevents foreign matter such as dirt or water on the outside from getting into the space 16 where the rolling elements 6 are located.

With the rolling bearing 1 with seal plate described above, there are the following cases when grease leakage may occur.

Specifically, when the rolling elements 6 rotate, the grease that adheres to these rolling elements 6 is scraped off on the inner diameter side of the retainer, and part of that grease is pressed out through the seal grooves 113. The seal lip 111 of the seal plate 108 is elastically deformed by the grease that is pressed out such that it is separated from the wall surface 115 of the seal groove 113, and this causes a small gap between the seal lip 111 and the wall surface 115 and grease leaks out through this small gap.

Moreover, as the pressure inside the space 16 where the rolling elements 6 are located-rises due to rolling friction or grease mixing resistance during use, this elastic deformation of the seal lip 111 becomes even greater, and thus grease leakage is even more severe.

In order to prevent grease leakage due to the aforementioned cause, the construction of the seal plate is tailored to improve the seal characteristics. For example, the rolling bearing 1 with seal plate that is disclosed in Japanese Patent Publication Toku Kai Hei 8-226449 is shown in FIG. 9. For the seal plate 108 that is installed in this rolling bearing 1 with seal plate, the angle is controlled between the end edge 112 of the seal lip 111 formed on the inner peripheral edge of the elastic member 110 and the wall surface 115 of the seal groove 113 that this seal lip 111 comes in contact with. That is, when the angle θ 17 between one inclined side surface 117 of the pair of inclined side surfaces 117, 118 of the end edge 112 and the wall surface 115 is made to be 50 to 85 degrees, and the angle θ 18 between the other inclined side surface 118 and the wall surface 115 is made to be 5 to 40 degrees, it is possible to improve the seal characteristics. Also, there is a constricted section 119 that fits all the way along the inner peripheral surface of the elastic member 110 which improve the followability of the seal lip 111 with respect to the wall surface 115.

Moreover, as shown in FIG. 10, it is known in the art that a seal lip 111 on the inner peripheral edge of the elastic member 110 of the seal plate 108 is forked such that this seal lip 111 crosses over the seal groove 113 formed on the outer peripheral surface on the end of the inner race 3, and comes in contact all the way around the circumference at two separate locations in the axial direction on the outer peripheral surface on the ends of inner race 3.

Furthermore, it is not shown in the figures, however, Japanese Patent Publications Toku Kai Hei 7-293571 and Toku Kai Hei 7-139553 disclose a construction where a seal lip on the inner peripheral edge of the elastic member comes in contact with the axially outer one of the pair of wall surfaces of the seal groove, and the length in the radial direction and thickness in the axial direction of this seal lip is controlled in order to maintain the seal characteristics.

Furthermore, Japanese Patent Publication Jitsu Kou Hei 6-27859 discloses a construction where a seal lip similarly comes in contact with the axially outer one of the wall surfaces, and where a variable labyrinth clearance is formed by a different seal lip that moves with the centrifugal force to maintain the seal characteristics.

In the case of this formerly known rolling bearing 1 with seal plate, constructed as described above, the following problems occur. First, in the case of the first example of prior art construction shown in FIGS. 7 and 8, the angle between the end edge 112 of the seal lip 111 and the wall surface 115 of the seal groove 113 is small. In other words, the angle a between the wall surface 115 and the inclined surface 120 of the edge 112 that faces this wall surface 115 is small. Therefore, when the grease is pressed out through the seal groove 113 and enters into the clearance between the wall surface 115 and the inclined surface 120, wedging action occurs as the grease moves in, and it become easy for elastic deformation of the seal lip 111 in the direction that separates it from the wall surface 115 to occur, and thus it is easy for a small gap to occur between the seal lip 111 and wall surface 115. In addition, it becomes easy for surface contact to occur between the end edge 112 of the seal lip 111 and the sliding contact area of the seal groove 113 to occur, making it difficult to maintain stable contact.

Moreover, in the case of the construction disclosed in Japanese Patent Publication Toku Kai Hei 8-226449 and shown in FIG. 9, there is a constricted section 119 formed on the inner peripheral edge of the elastic member 110, so elastic deformation of the seal lip 111 becomes easy, and thus becomes easy for a small gap to occur between the seal lip 111 and the wall surface 115.

Also, since the angle θ 17 between one of the inclined surfaces 117 of the edge 112 of the seal lip 111 and the wall surface 115 of the seal groove 113 is large, the overall dimension in the axial direction of the seal plate 108 increases.

Furthermore, it becomes easy for foreign matter from the outside to build up in the gap between the other inclined surface 118 of the end edge 112 and the side wall surface 115, and this foreign matter presses the seal lip 111 in a direction that separates it from the wall surface 115. Therefore, when this construction is used in cases where the outer race 5 rotates, it particularly becomes difficult to prevent foreign matter from getting inside.

Also, in the case of the construction shown in FIG. 10, it becomes easy for a contact state in the sliding contact section between the outer peripheral surface on the end of the inner race 3 and the edge of the seal lip 111 to be varied due to offset of the center axis of the inner race 3 and outer race 5 that occurs due to external force that is applied during use because of shape and dimensional errors of the seal groove 113, and thus it becomes difficult to obtain stable seal performance.

Moreover, in the case of the construction disclosed in Japanese Patent Publications Toku Kai Hei 7-293571 and Toku Kai Hei 7-139553, the seal lip comes in sliding contact with the axial outer one of the wall surfaces, so it is necessary to form an air hole for releasing pressure in the internal space, and thus it becomes easy for grease to leak from this air hole.

Furthermore, in the case of the construction disclosed in Japanese Patent Publication Jitsu Kou Hei 6-27859, it becomes easy for the seal lip for the labyrinth clearance to become hard due to heat degradation, and thus it becomes impossible to adequately maintain the flexibility of the grease lip for a long period of time, and it is difficult to maintain good seal characteristics over a long period of time.

In this way, of the grease that adheres to the edges of the openings, the part of the grease that builds up on the inner peripheral surface of the retainer is pressed out through the seal groove 113. Also, the seal lip 111 of the seal plate 108 is elastically deformed by the grease that is pressed out in the direction that separates it from the wall surface of the seal groove 113, and this creates a small gap between the seal lip 111 and the wall surface, and grease leaks from this small gap.

Moreover, when the pressure inside the space 16 where the balls 6 are located, due to the rise in temperature caused by rolling friction or mixing resistance of the grease when the bearing is in use, the elastic deformation of the seal lip 111 becomes even greater, and grease leakage becomes more severe. When this kind of grease leakage occurs, the amount of grease that remains in the space 16 gradually decreases over a long period of time, and there is a possibility that abnormal wear or seizure could occur due to poor lubrication.

As mentioned previously, Grease leakage, which is the cause of this kind of trouble, is worse in the case when the inner race 3 is still and the outer race 5 is rotated than in the case when the outer race 5 is still and the inner race 3 is rotated, because the grease 20 adheres to the rolling track surface of the rotating surface of the balls 6, easily moves radially inward within the retainer. The grease that has once entered inside the retainer remains on the outer peripheral surface of the still inner race 3 and it becomes difficult for it to return to the outside.

Construction of a bearing for preventing this kind of grease leakage, such as that disclosed in Japanese Patent Publications Toku Kai Hei 8-270662 and Jitsu Kai Hei 6-73454, has been previously known.

Of these, in the case of the construction disclosed in Toku Kai Hei 8-270662, as shown in FIG. 11, a forked seal lip 111 is formed on the inner peripheral edge of the elastic member 110 of the seal plate 108. Also, of this seal lip 111, the protruding section 214, that protrudes toward the ball 6 comes very close to the outer peripheral surface of the inner race 3.

Also, of this seal lip 111, the end edge of the protruding section 214 that protrudes toward the radially inside comes in sliding contact with the axially outer wall of the seal groove 113 that is formed on the outer peripheral surface of the inner race 3. Furthermore, the tip end surface of the protruding section 214 that protrudes toward the ball 6 is inclined outward in the axial direction as it moves outward in the radial direction.

Moreover, in the case of the prior art construction shown in FIG. 11, an inside shoulder section 215 is formed at a radius greater than the radius of the inner-race track 2 on the outer peripheral surface of the inner race 3 adjacent to the axially outer portion of the inner-race track 2, and the size of the radially inner ring-shaped gap 227 between the inside shoulder section 215 and the inner peripheral surface of the retainer 7, that faces this inside shoulder section 215 in the radial direction, is taken to be $L_1$; and the size at the radially inner end of a ring-shaped gap 217, that is formed between the surface on one axial side of the retainer 7 and the axially inner surface of the seal plate 108, is taken to be $L_2$, where $L_1 \leq L_2$.

Accordingly, in the construction disclosed in Japanese Patent Publication Toku Kai Hei 8-270662, it becomes easy for the grease inside the retainer 7 to flow to the outside of the retainer 7 through the aforementioned ring-shaped gap 217, and thus it is possible to prevent this grease from leaking out through the gap between the seal groove 113 and the seal plate 108.

Also, construction similar to the construction disclosed in Japanese Patent Publication Toku Kai Hei 8-270662 is disclosed in Japanese Patent publication Jitsu Kai Hei 6-73454. However, the construction disclosed in Jits Kai Hei 6-73454 differs from the construction disclosed in Toku Kai Hei 8-270662 in that the dimensions of the ring-shaped gap between the surface on the one axial side of the retainer and the seal plate are not considered.

As described above, in the case the construction disclosed in Japanese Patent Publication Toku Kai Hei 8-270662, grease is prevented from leaking by regulating the size $L_2$ of the radially inner end of the ring-shaped gap 217 such that it is greater than the size $L_1$ in the radial direction of the inner ring-shaped gap 227 ($L_1 \leq L_2$), however, it cannot be said that this prevention of leakage is sufficient.

In other words, in the construction disclosed in Japanese Patent Publication Toku Kai Hei 8-270662, the relationship of the size at other sections of the ring-shaped gap 217, or the size in the radial direction of the radially outer ring-shaped gap, that is formed between the outer peripheral surface of the retainer 1 and the inner peripheral surface of the outer race 5, with the size $L_1$ in the radial direction of the radially inner ring-shaped gap 227 is not particularly taken into consideration. For example, in the construction shown in FIG. 11, the size $L_3$ in the axial direction of the radially middle section of the ring-shaped gap 217, is less than the size $L_2$ of the radially inside end ($L_3 \leq L_2$). In addition, the size $L_4$ in the radial direction of the outer ring-shaped gap 228 between the outside shoulder section 218 at a radius less than the outer-race track 4, and the outer peripheral surface of the retainer 7 is less than the size $L_1$ in the radial direction of the inner ring-shaped gap 227 ($L_4 < L_1$). In this case, the grease does not flow smoothly enough to the radially outside, and there is a possibility that grease radially inside the retainer 7 will build up. In that case, there is a further possibility that grease leakage will not be sufficiently prevented.

Moreover, in the case of the conventional constructions as disclosed in the prior art documents, once the grease enter the seal groove 113 formed in the outer peripheral surface on the ends of the inner race 3, this grease is hindered by part of the seal plate 108 and it becomes easy for the grease to return from inside the seal groove 113 to the side where the ball 6 is. Accordingly, the grease that entered inside the seal groove 113 gradually increases, and finally leaks out through the gap between the seal groove 113 and the seal plate 108.

Moreover, in the case of the conventional constructions as disclosed in the prior art documents, the position relationship in the axial direction between the outside surface in the axial direction of the retainer 7 and the end of the seal groove 113 is not particularly considered, and in the case that the grease inside of the retainer 7 is pressed out in the axial direction, there is a possibility that part of this pressed out grease will easily enter inside the seal groove 113. When part of the grease enters inside the seal groove 113 in this way, it is not possible to adequately prevent grease leakage. Particularly, when this bearing is used in a relatively small device, such as when a ball bearing with seal plate is installed in a device such as a hard disk drive (HDD), grease entering inside the seal groove 113 becomes severe.

SUMMARY OF THE INVENTION

A objective of the present invention is to provide a ball bearing wherein lubrication grease inside the ball bearing is prevented from leaking out and harmful noise is prevented from generating.

Another objective of the present invention is to provide a ball bearing wherein grease is smoothly fed into the clearance between the inner peripheral surface of the cage and the rolling surface of the balls in the cage.

DETAILED DESCRIPTION OF THE PREFERRED EMBODIMENTS

Figure 1:
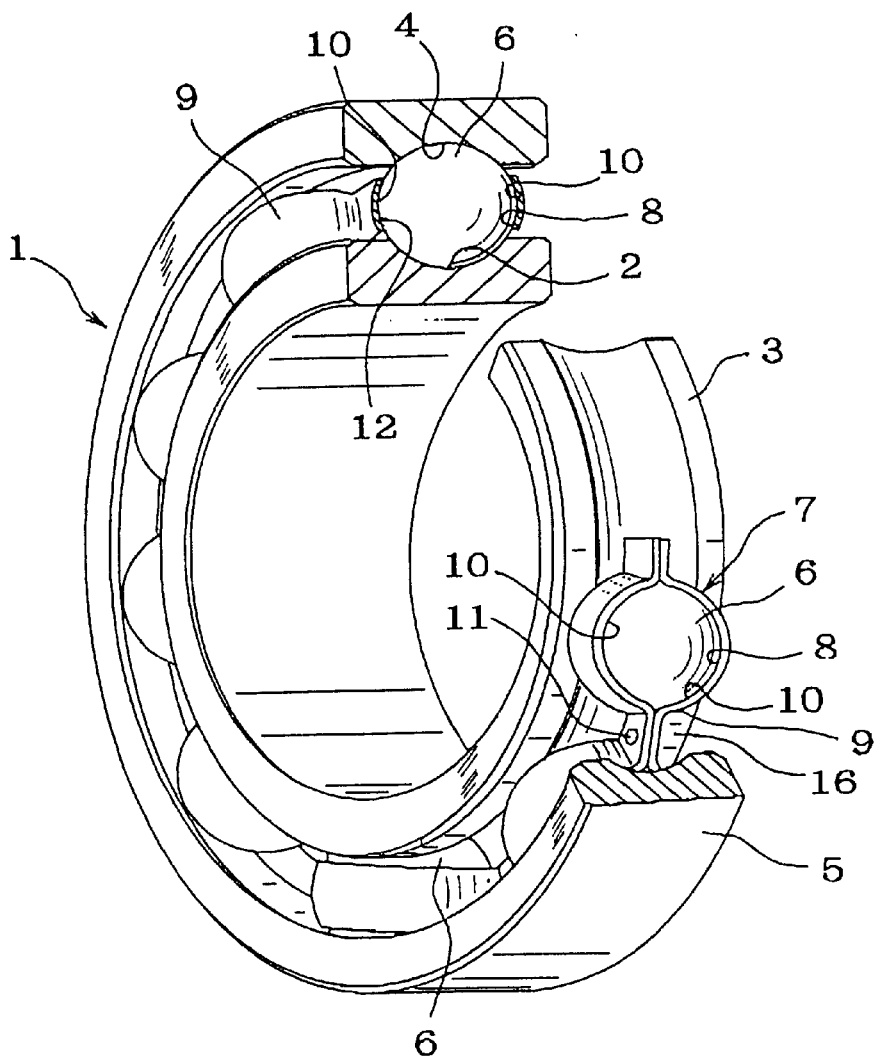
FIG. 1 is a partly cut-away perspective view of a conventional ball bearing.
Figure 2:
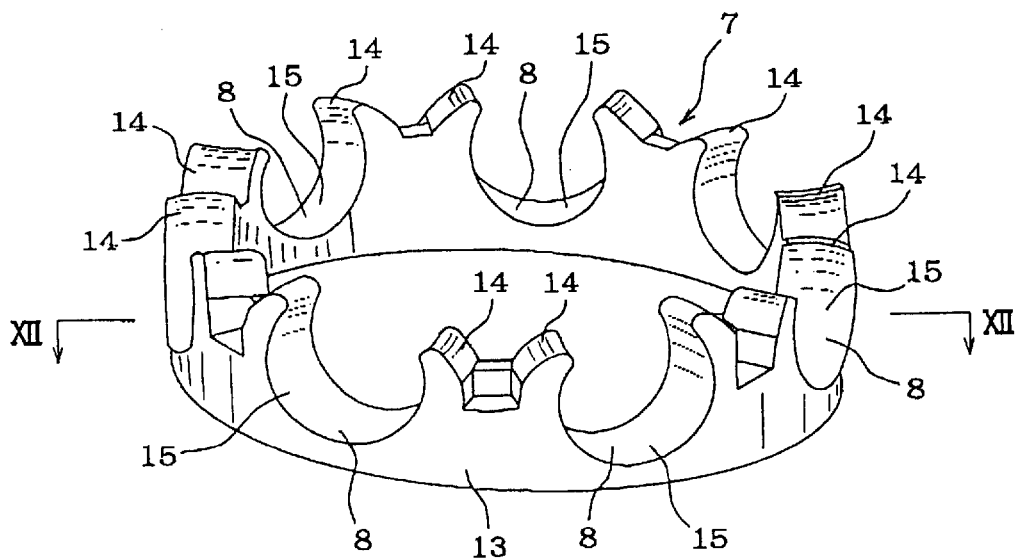
FIG. 2 is a perspective view of a conventional crown type retainer.
Figure 3:
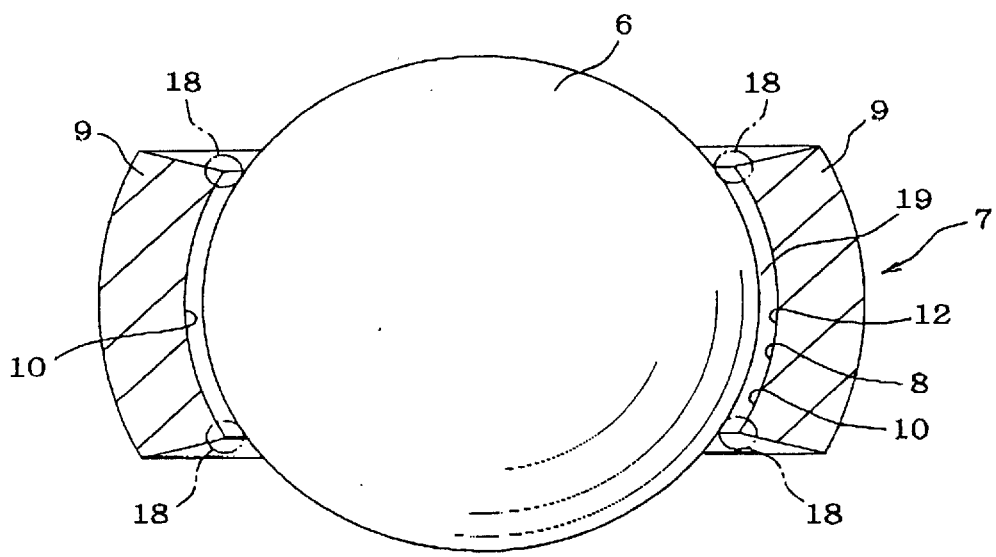
FIG. 3 is a cross sectional view of the retainer used in the ball bearing of FIG. 1 with a ball held therein.
Figure 4:
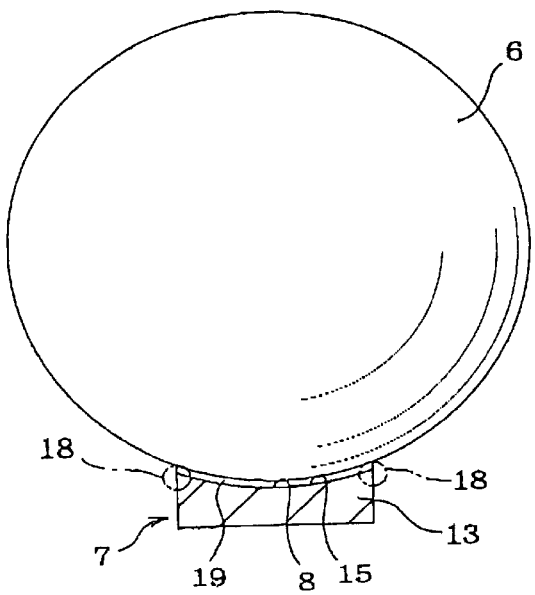
FIG. 4 is a cross sectional view of the retainer of FIG. 2 with a ball held therein.
Figure 5:
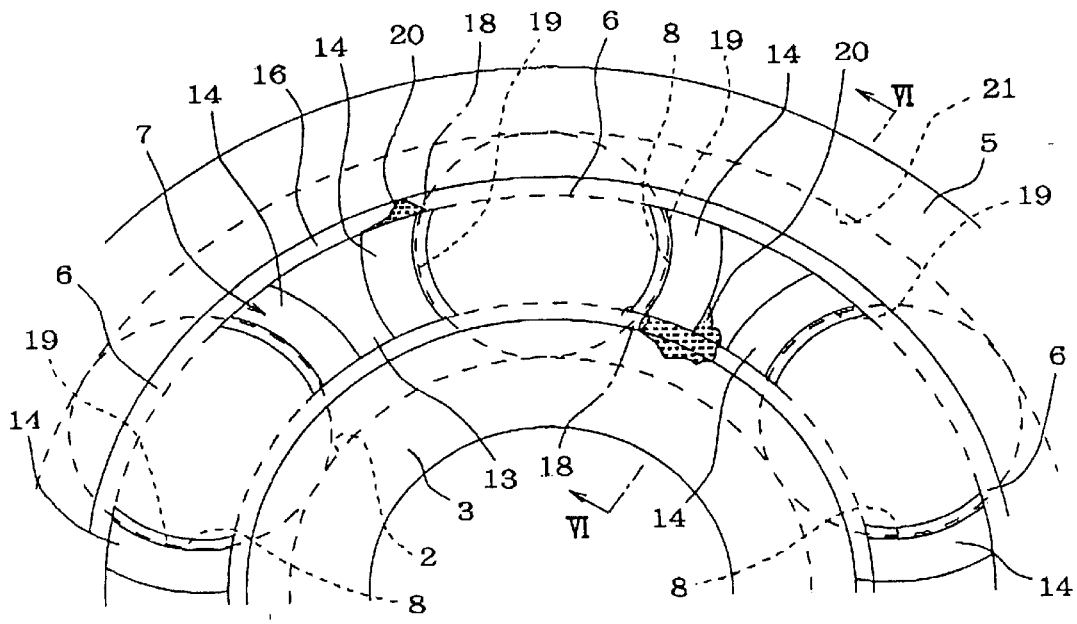
FIG. 5 is a front elevational view of part of a ball bearing to show a state where grease is attached to part of the retainer during use.
Figure 6:
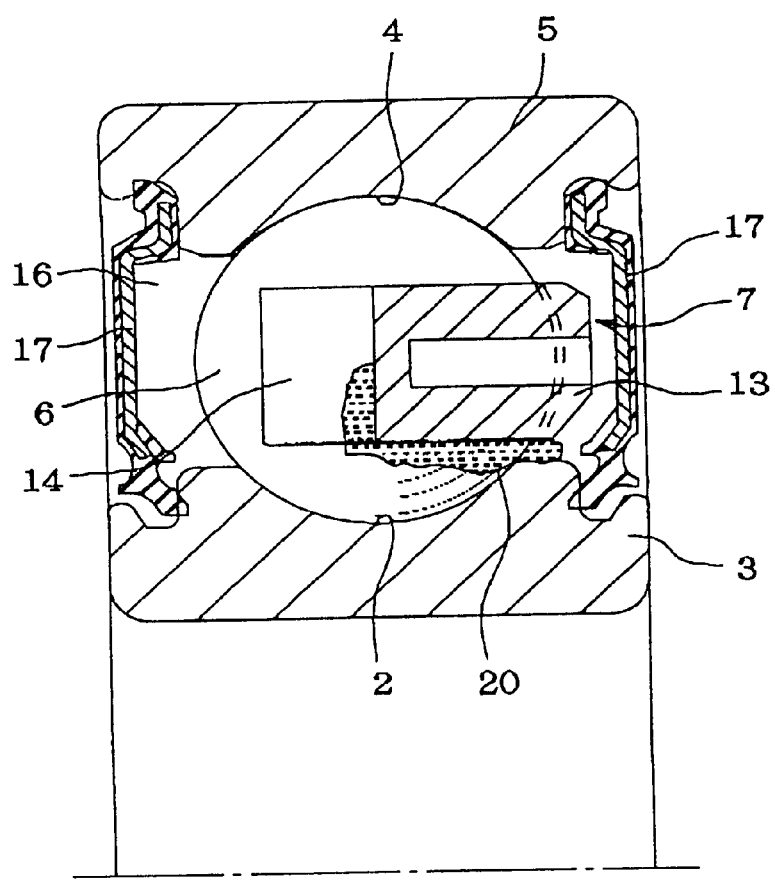
FIG. 6 is a cross sectional view taken along the line VI—VI of FIG. 5.

FIGS. 12 thru 15 show an example of the embodiments of this invention which is applied to the crown-shaped retainer shown in FIG. 2. This embodiment is characterized by tailoring the shape of the pockets 8 so as to prevent grease 20 from adhering to the edge around the opening on the radially inside of the pockets 8, that is formed in part of the inner peripheral surface of the retainer 7, as shown in FIGS. 5, 6.

The shape of the entire retainer 7, except for the shape of the pockets 8, is the same as the prior construction shown in FIGS. 2, 5 and 6, so any redundant figures and explanations will be abbreviated or omitted, and only the main characteristic parts of this invention will be explained below.

The retainer 7 for a ball bearing of this invention comprises a ring-shaped main section 13 and a plurality of elastic pieces 14 that arc formed on one side in the axial direction of the main section 13 to define pockets 8, and the inner peripheral surface of the pockets 8 is formed such that the radially inner section 21, that exists further toward the center than the pitch circle P of the balls 6 that are held inside these pockets 8, is formed in a partial cylindrical surface. In other words, this radially inner section 21, except for the non-continuous section of the tip ends of the pair of elastic pieces 14 of the pockets 8, is formed in a cylindrical surface that has an inner diameter a little larger than the diameter of the balls 6 and a single central axis.

In the example shown in the figure, the inner peripheral surface of the pockets 8 is formed in a partial cylindrical surface which is continuous from the radially inner section 21 to a portion a little closer to the outer diameter than the pitch circle P. Accordingly, when the balls 6 are held inside the pockets 8, the gap between the rolling surface of the balls 6 and the inner peripheral surface of the pockets 8, in the radially inner section 21 which is further toward the center than the pitch circle P, gradually becomes wider toward the opening on the radially inside of the retainer 7. On the other hand, the radially outer section 22, which is formed on the inner peripheral surface of the pockets 8 further radially outward than the pitch circle P, is centered around the center of the respective balls 6 that is on the pitch circle P, and it has a spherical concave shape with an inner radius that is slightly larger than the radius of the balls 6. In addition, of the openings on both ends in the radial direction of the pockets 8, the diameter of the maximum inscribed circle of the openings on the radially outside of the retainer 7, defined at the end of this specification, on the inner periphery edge of the radially outer section 22 is smaller than the diameter of the balls 6.

Similar to the prior art crown-shaped retainer 7 shown in FIGS. 5 and 6, the retainer 7 described above, is installed between the outer peripheral surface of the inner race 3 and the inner peripheral surface of the outer race 5, and balls 6 are rollably held in the pockets 8 between the inner-race track 2 and outer-race track 4, respectively. With the balls 6 held in the pockets 8, the rolling surface, specifically rolling track surface, of the balls 6 comes in contact with or very close to the inner periphery edges of the radially outer sections 22 on the inner peripheral surface of the pockets 8. As a result, positioning in the radial direction of the retainer 7 is accomplished by its fit with the rolling surface of the balls 6, and it becomes a so-called rolling element guide. In other words, the inner peripheral surface of the retainer 7 is separated from the outer peripheral surface of the inner race 31, and similarly the outer peripheral surface of the retainer 7 is separated from the inner peripheral surface of the outer race 5.

Moreover, the retainer 7 is installed in a ball bearing as shown in FIGS. 5 and 6, and when the ball bearing is operated with a specified amount of grease filled in the gap between the outer peripheral surface of the inner race 3 and the inner peripheral surface of the outer race 5, and sealed by a pair of seal plates 17, it is possible to keep the grease from leaking out from the seal plates 17. In other words, when the ball bearing is operating, the grease that adheres to the rolling surface of the balls 6 is fed radially inward within the retainer 7 as the balls 6 roll.

Of the openings on both radial ends of the pockets 8, there is sufficient space between the peripheral edge around the opening in the inner peripheral surface of the retainer 7 and the rolling surface of the balls 6, so it is easy for grease to go into the pockets 8 from the inner peripheral surface of the retainer 7. As a result, the grease that adheres to the rolling surface of the balls 6 does not remain on the inner peripheral surface of the retainer 7, but moves into the radially outer section inside the pockets 8.

In this way, since the grease that adheres to the rolling surface of the balls 6 does not remain on the inner peripheral surface of the retainer 7, it is prevented that the grease presses on the radially inner edge of the seal plate 17 to leak out, and thus it is possible to prevent the occurrence of improper lubrication due to a decrease in grease.

At the same time, it becomes easy for the grease to be taken into the gap between the inner peripheral surface of the pockets 8 and the rolling surface of the balls 6, so there is a good lubrication condition at the section of sliding contact. In other words, of the peripheral edges on the openings of the pockets 8, the flow of grease into the pockets 8 from the opening on the inner peripheral surface of the retainer 7 is not obstructed, and it becomes easy for the grease to flow into the pockets 8. Therefore, it becomes difficult for vibration or noise, called retainer noise, to occur.

Figure 16:
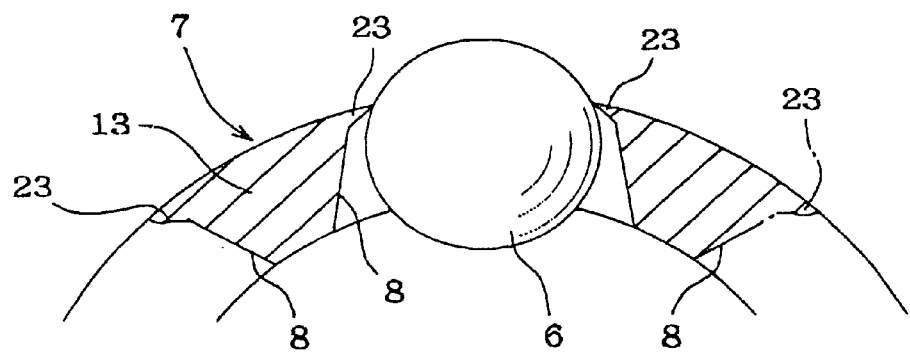
FIG. 16 is a view similar to FIG. 13 to show a second example of the present invention.
Figure 17:
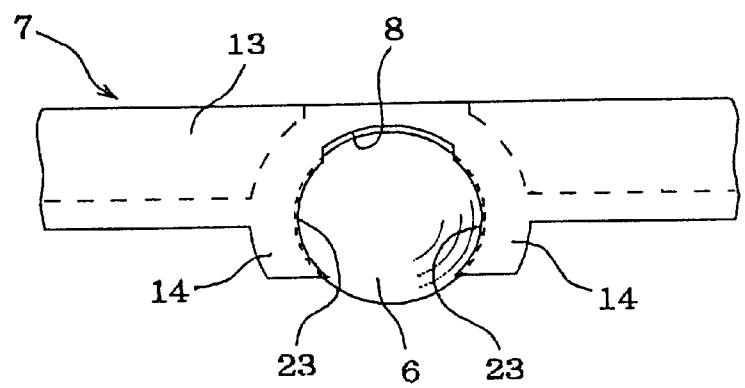
FIG. 17 is a top plan view of the portion shown in FIG. 16.

Next, a second example of the embodiments of the invention is shown in FIGS. 16 and 17. In this example, the inner peripheral surface of the pockets 8 is formed in a partial cylindrical shape from the inner peripheral surface of the retainer 7 to the outer peripheral surface. However, in this example, on the edge of the opening on the outer peripheral surface of the retainer 7, there is a pair of protruding pieces 23, in an eaves shape, on the inner peripheral surface of the pockets 8, which face the rolling track surface of the balls 6. In addition, the diameter of the maximum inscribed circle of the openings on the radially outside of the retainer 7, which is the diameter of the inscribed circle of the tip end edges of the aforementioned protrusions 23, is less than the diameter of the balls 6.

With the construction of this second example as well, the retainer 7 can rotatably supported between the outer peripheral surface of the inner race 3 and inner peripheral surface of the outer race 5 (see FIG. 5 and 6) by way of the rolling element guide.

Moreover, the grease inside the retainer 7 is efficiently fed to the radially outside through a sufficient space between the peripheral edge of the openings on the inner peripheral surface of the retainer 7 and the rolling surface of the balls 6. Therefore, similar to the first example described above, it is possible to prevent leakage of the grease and maintain sufficient durability, while at the same time prevent the occurrence of vibration and noise.

Figure 18:
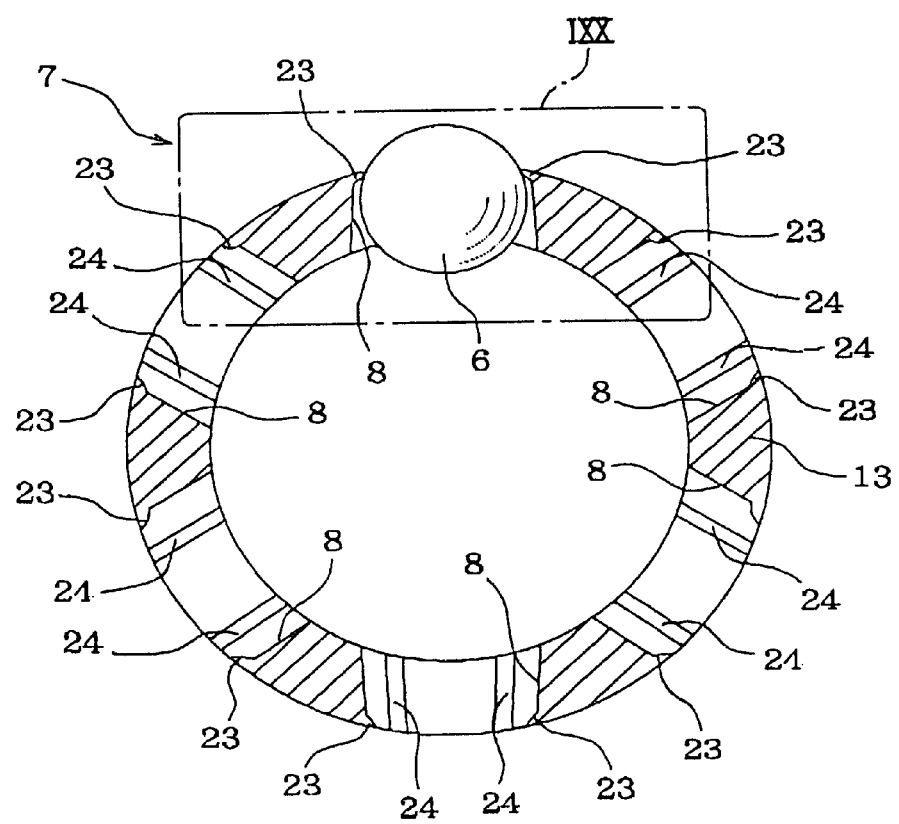
FIG. 18 is a cross sectional view of a third example of the retainer according to the present invention where a ball is held therein, corresponding to the cross section taken by arrows XII—XII in FIG. 2.
Figure 19:
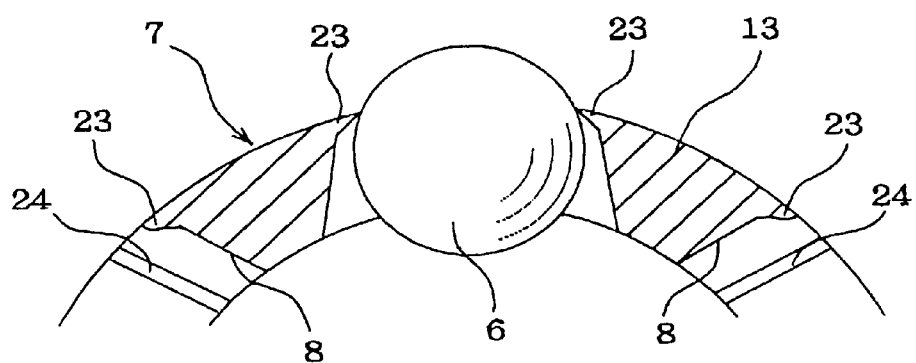
FIG. 19 is an enlarged view of Section It of FIG. 18.
Figure 20:
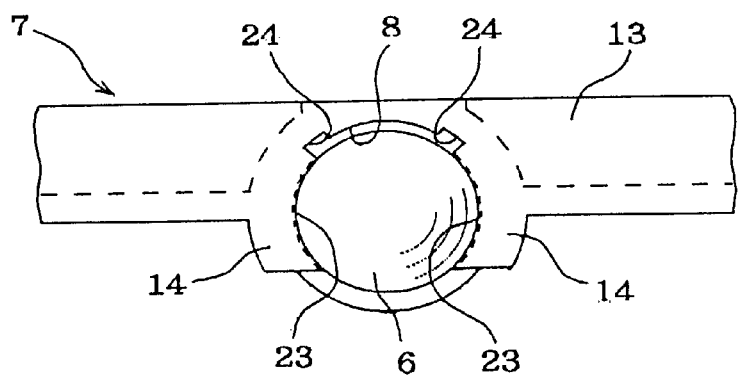
FIG. 20 is a top plan view of the portion shown in FIG. 19.
Figure 21:
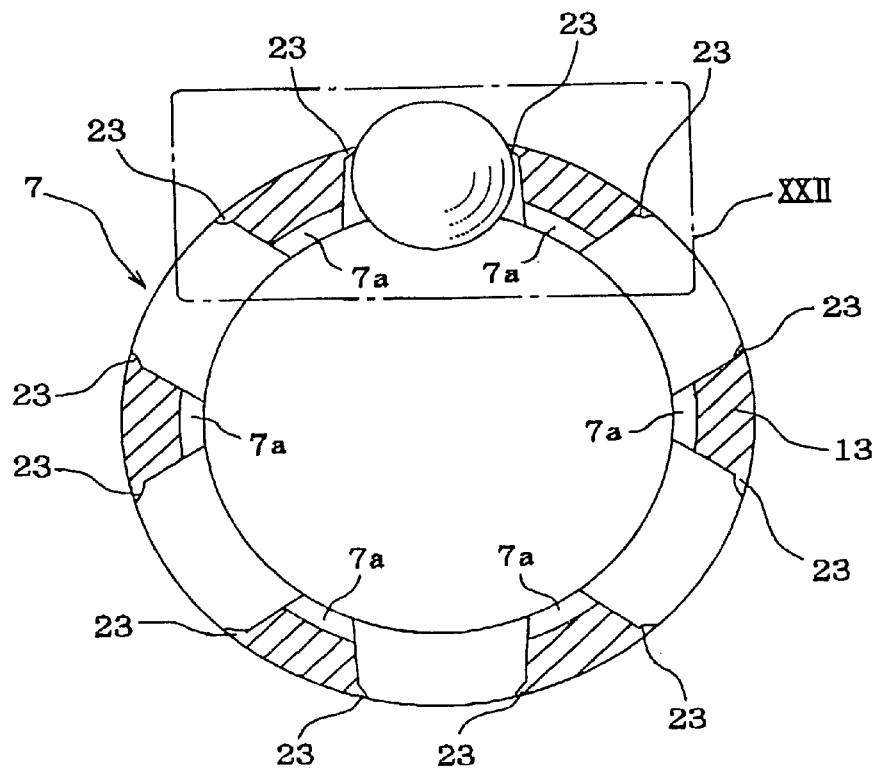
FIG. 21 is a cross sectional view of a fourth example of the embodiments of the retainer according to the present invention where a ball is held therein, corresponding to the cross section taken by arrows XII—XII in FIG. 2.
Figure 22:
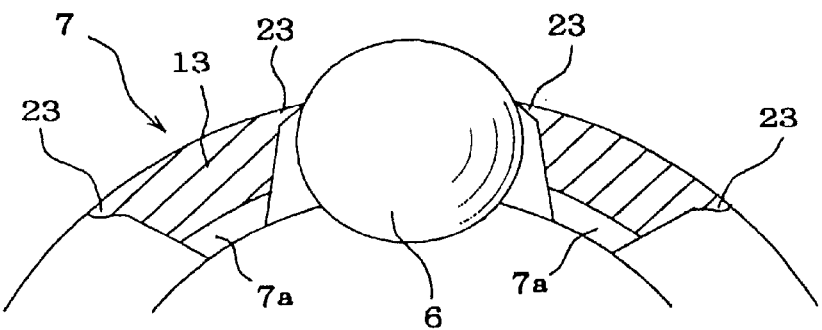
FIG. 22 is an enlarged view of Section XXII of FIG. 21.
Figure 23:
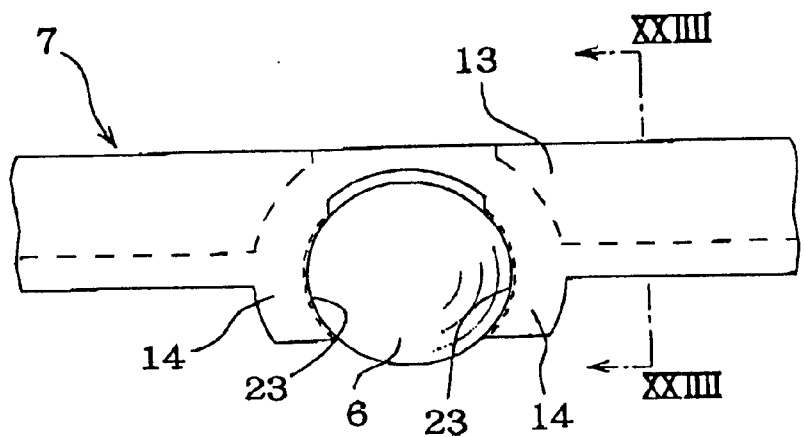
FIG. 23 is a top plan view of the portion shown in FIG. 22.
Figure 24:
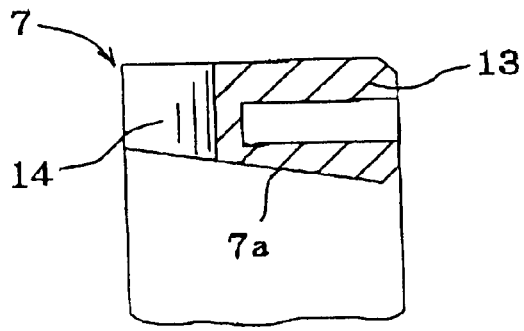
FIG. 24 is a cross sectional view taken along the line of XXIIII—XXIIII of FIG. 23.

Next, a third example of the embodiments of the invention is shown in FIGS. 18 to 20. In the retainer 7 of this example, there are concave grooves 24 formed in the section on the inner peripheral surface of the respective pockets 8 adjacent to the end of the protruding pieces 23 extending from the inner peripheral surface of the retainer 7 to the outer peripheral surface. By forming this kind of concave grooves 24, it is possible to smoothly feed the grease inside the retainer 7 to the outside, and thus it is possible to prevent leakage of grease. The other construction and functions are substantially the same as those of the second example described above.

Next, a fourth example of the embodiment of the invention is shown in FIGS. 21 to 24. In this example, the inner peripheral surface 7a of the retainer 7 is inclined in the axial direction, such that it is possible to efficiently discharge grease that adheres to the inner peripheral surface to the radially outside. In other words, the inner peripheral surface 7a of the retainer 7 is formed in a conical concave shape that inclines in a direction such that the diameter increases the closer to the tip ends of the elastic pieces 14. Therefore, the grease that adheres to the inner peripheral surface of the retainer 7 is fed toward the tip ends of the elastic pieces 14 by the centrifugal force that occurs as the retainer 7 turns, and is then fed through the gap between the pair of elastic pieces 14 to the radially outside of the retainer 7. The other construction and functions are substantially the same as those of the second example described above.

Figure 25:
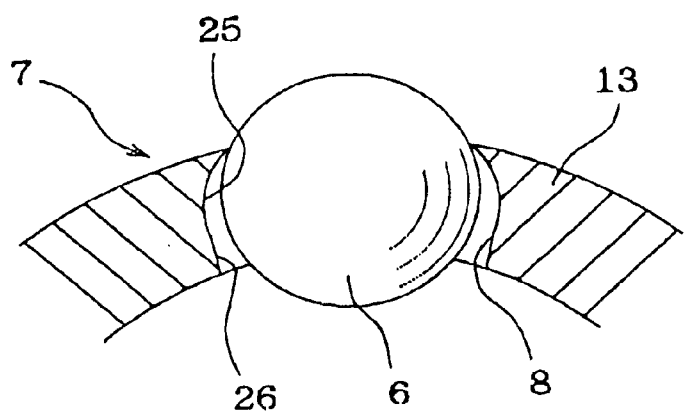
FIG. 25 is an enlarged view similar to FIG. 13 to show a fifth example of the embodiments of the retainer according to the present invention.

Next, a fifth example of the embodiment of the invention is shown in FIG. 25. The retainer 7 of this example comprises a single-center spherical concave surface section 25 in the section from the radially outside end of the pockets 8 to the middle, and a cylindrical surface section 26 on the radially inside end of the pockets 8. Similar to the first example, the retainer 7 of this embodiment makes it possible to prevent leakage of the grease and maintain adequate durability while at the same time prevent the occurrence of vibration and noise.

Figure 26:
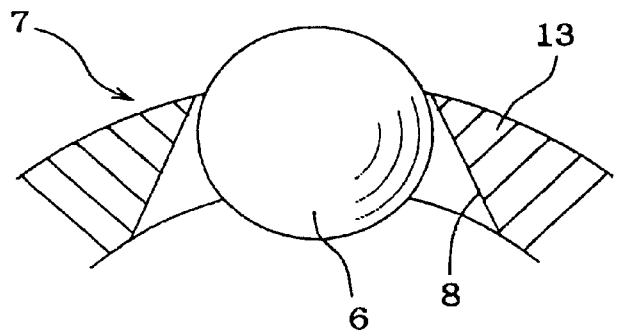
FIG. 26 is an enlarged view similar to FIG. 13 to show a sixth example of the embodiments of the retainer according to the present invention.

Next, a sixth example of the embodiment of the invention is shown in FIG. 26. In the retainer 7 of this example, the inner peripheral surface of the pockets 8 is formed in a conical concave surface that is inclined in a direction such that the diameter becomes smaller toward the radially outside of the retainer 7. Similar to the first example, the retainer 7 of this example makes it possible to prevent leakage of the grease and maintain adequate durability while at the same time prevent the occurrence of vibration and noise.

Figure 27:
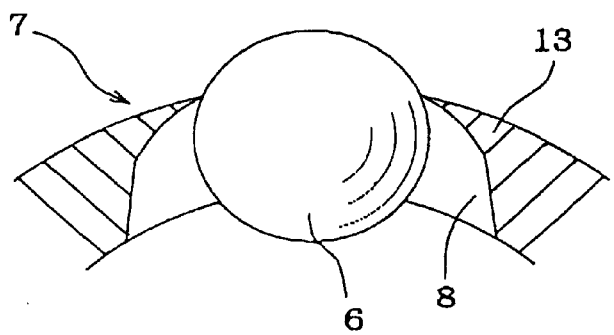
FIG. 27 is an enlarged view similar to FIG. 13 to show a seventh example of the embodiments of the retainer according to the present invention.

Next, a seventh example of the embodiment of the invention is shown in FIG. 27. In the retainer 7 of this example, the inner peripheral surface of the pockets, 8 is formed in a bell-shaped concave surface whose radii of curvature form a smooth continuous surface. Similar to the first example, the retainer 7 of this example makes it possible to prevent leakage of the grease and maintain adequate durability while at the same time prevent the occurrence of vibration and noise.

Figure 28:
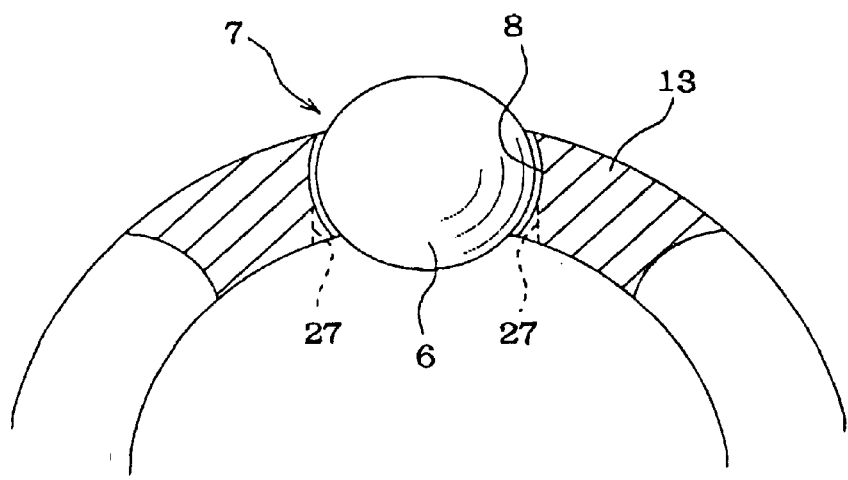
FIG. 28 is a cross sectional view of part of the retainer of an eighth example of the embodiments of the retainer according to the present invention, where a ball is held therein.
Figure 29:
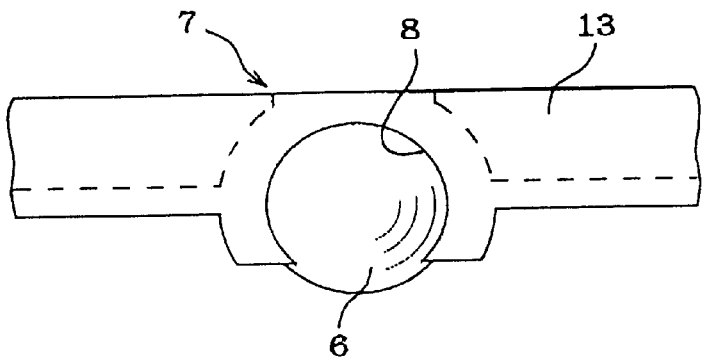
FIG. 29 is a top plan view of the portion shown in FIG. 28.
Figure 30:
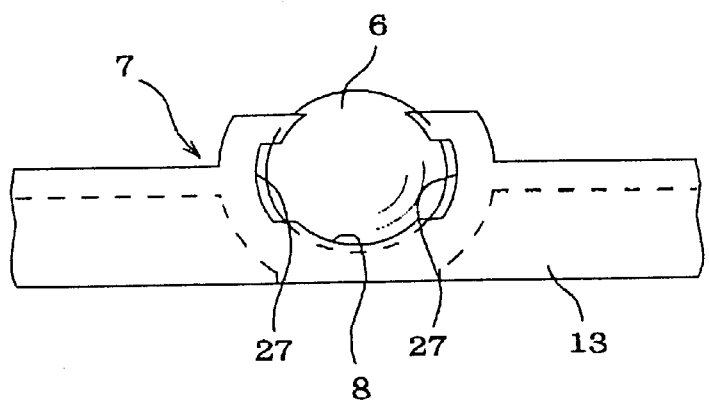
FIG. 30 is a bottom plan view of the portion shown in FIG. 28.

Next, an eighth example of the embodiment of the invention is shown in FIGS. 28 to 30. In the retainer 7 of this example, the inner peripheral surface of the pockets 8 is formed in a spherical concave surface having a radius of curvature that is a little larger than the radius of curvature of the rolling surface of the balls 6 rollably held in the pockets 8. In addition, at two locations on opposite sides in the radial direction of the inner peripheral surface of the pockets 8, there are concave grooves 27 in the sections that face the rolling track surface of the balls 6 held in the pockets 8 and they extend to the inner peripheral surface of the retainer 7.

In the case of this example, the grease that reaches radially inside the retainer 7 and adheres to the rolling surface of the balls 6 is taken into the inside of the pockets 8 through the concave grooves 27. A large part of the grease that adheres to the rolling surface of the balls 6 adheres to the rolling track surface, so supply of the grease into the pocket through the concave grooves 27 is done efficiently as in the case of the first example. The other construction and functions are substantially the same as those of the first example described above.

Figure 31:
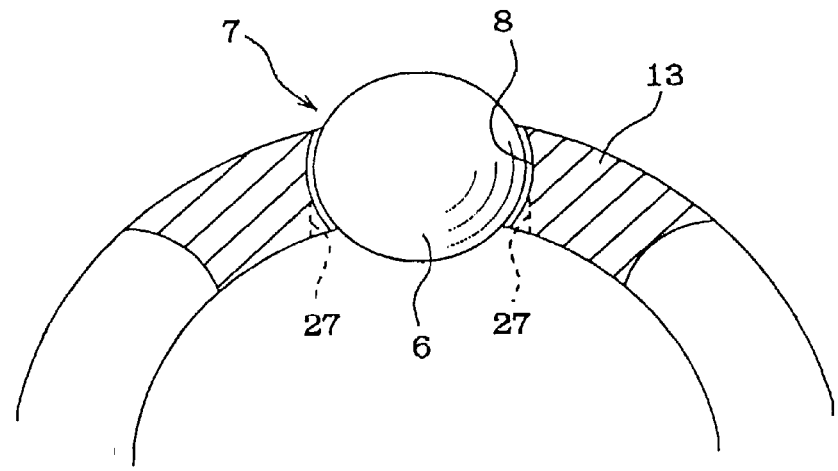
FIG. 31 is a cross sectional view of part of the retainer of a ninth example of the embodiments of the retainer according to the present invention, where a ball is held therein.
Figure 32:
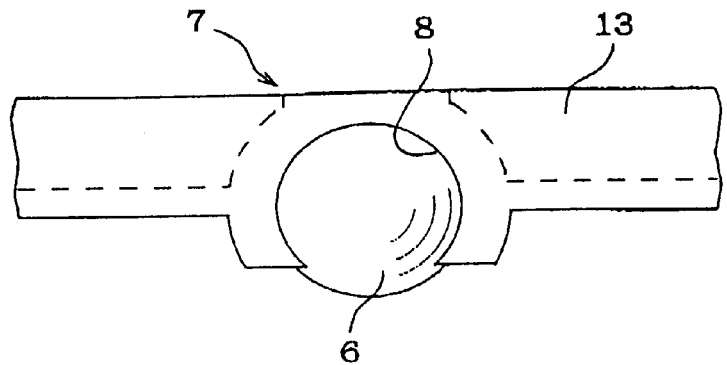
FIG. 32 is a top plan view of the portion shown in FIG. 31.
Figure 33:
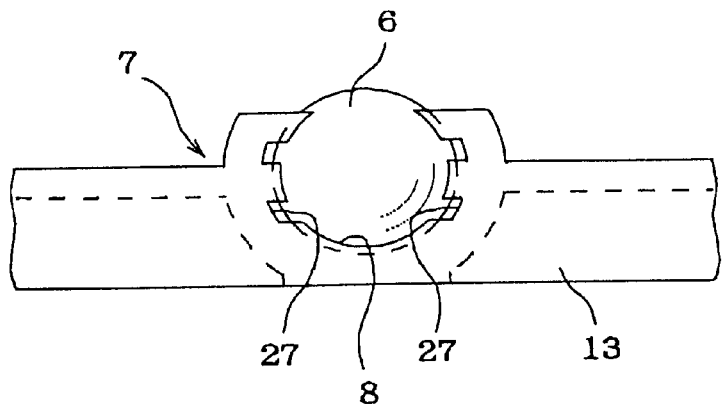
FIG. 33 is a bottom plan view of the portion shown in FIG. 31.

Next, a ninth example of the embodiment of the invention is shown in FIGS. 31 to 33. In the retainer 7 of this example, at two locations on opposites sides in the radial direction on the inner peripheral surface of the pockets 8, there are four concave grooves 27, two on each side, in the sections that face the rolling track surface of the balls 6 held in the pockets 8 and they extend to the inner peripheral surface of the retainer 7. Except for increasing the number of concave grooves 27, the other construction and functions are substantially the same as those of the eighth example described above. It is also possible to form three or more concave grooves 27 on each side.

Figure 34:
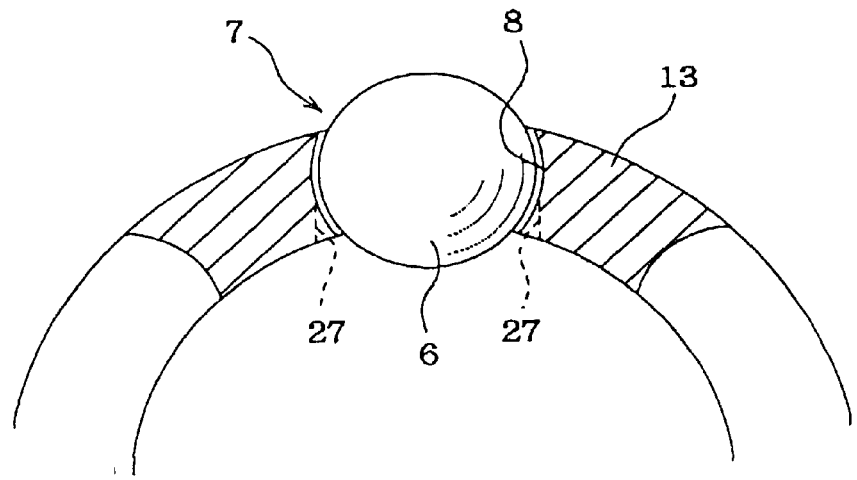
FIG. 34 is a cross sectional view of part of the retainer of a tenth example of the embodiments of the retainer according to the present invention, where a ball is held therein.
Figure 35:
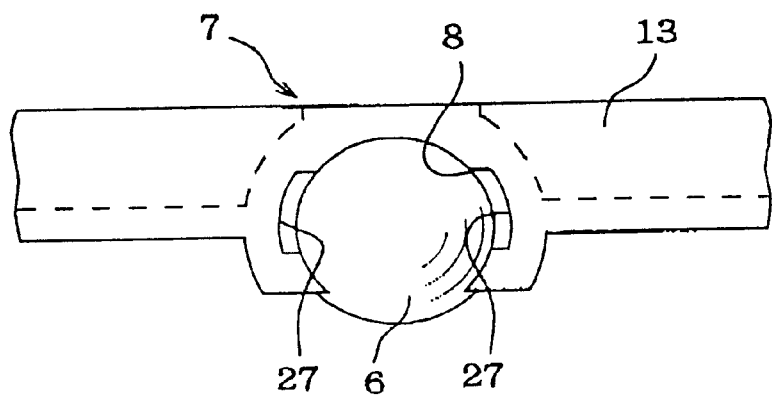
FIG. 35 is a top plan view of the portion shown in FIG. 34.
Figure 36:
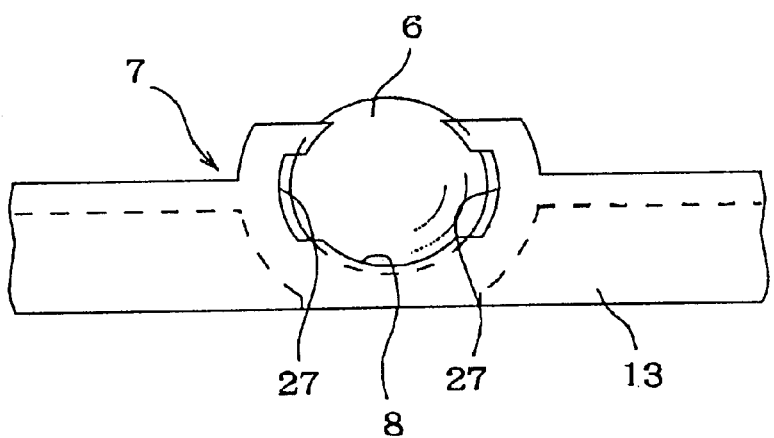
FIG. 36 is a bottom plan view of the portion shown in FIG. 34.

Next, a tenth example of the embodiment of the invention is shown in FIGS. 34 to 36. In the retainer 7 of this example, at two locations on opposite sides in the radial direction on the inner peripheral surface of the pockets 8, in the sections that face the rolling track surface of the balls 6 held in the pockets 8, there are concave grooves 27 that extend from the inner peripheral surface of the retainer 7 to the outer peripheral surface. In this way, since these concave grooves 27 extend to the outer peripheral surface, it is possible to more efficiently move the grease that adheres to the rolling track surface of the balls 6 to the radially outside of the retainer 7. The other construction and functions are substantially the same as those of the eighth example described above.

The ball bearing with a retainer of this invention, is constructed and functions as described above, and makes it possible to adequately prevent the grease from building up inside the retainer, pressing on the seal plate and leaking out, as well as makes it possible to maintain a condition of good lubrication and durability over a long period of time. Also, there is a good condition of lubrication in the section of sliding contact between the rolling surface of the balls and the inner peripheral surface of the retainer pockets. As a result, it is possible for a ball bearing using the ball-bearing retainer of this invention, to suppress the occurrence of retainer noise, and to obtain a ball bearing with low vibration and noise. Furthermore, with the ball-bearing retainer of this invention, friction at the points of sliding contact between the rolling surface of the balls and the inner peripheral surface of the retainer pockets has been reduced, so it is also possible to improve the resistance to wear of the retainer.

Figure 37:
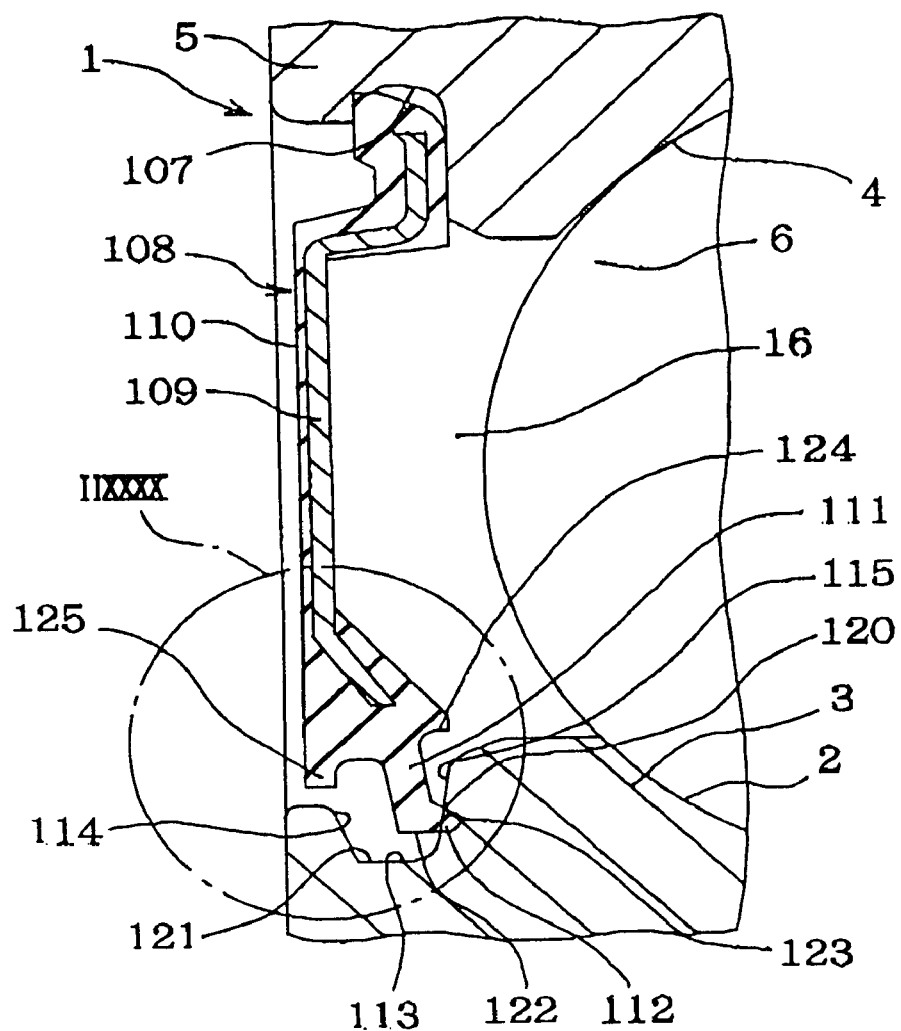
FIG. 37 is a cross sectional view of part of the retainer of an eleventh example of the embodiments of the retainer according to the present invention, where a ball is held therein.
Figure 38:
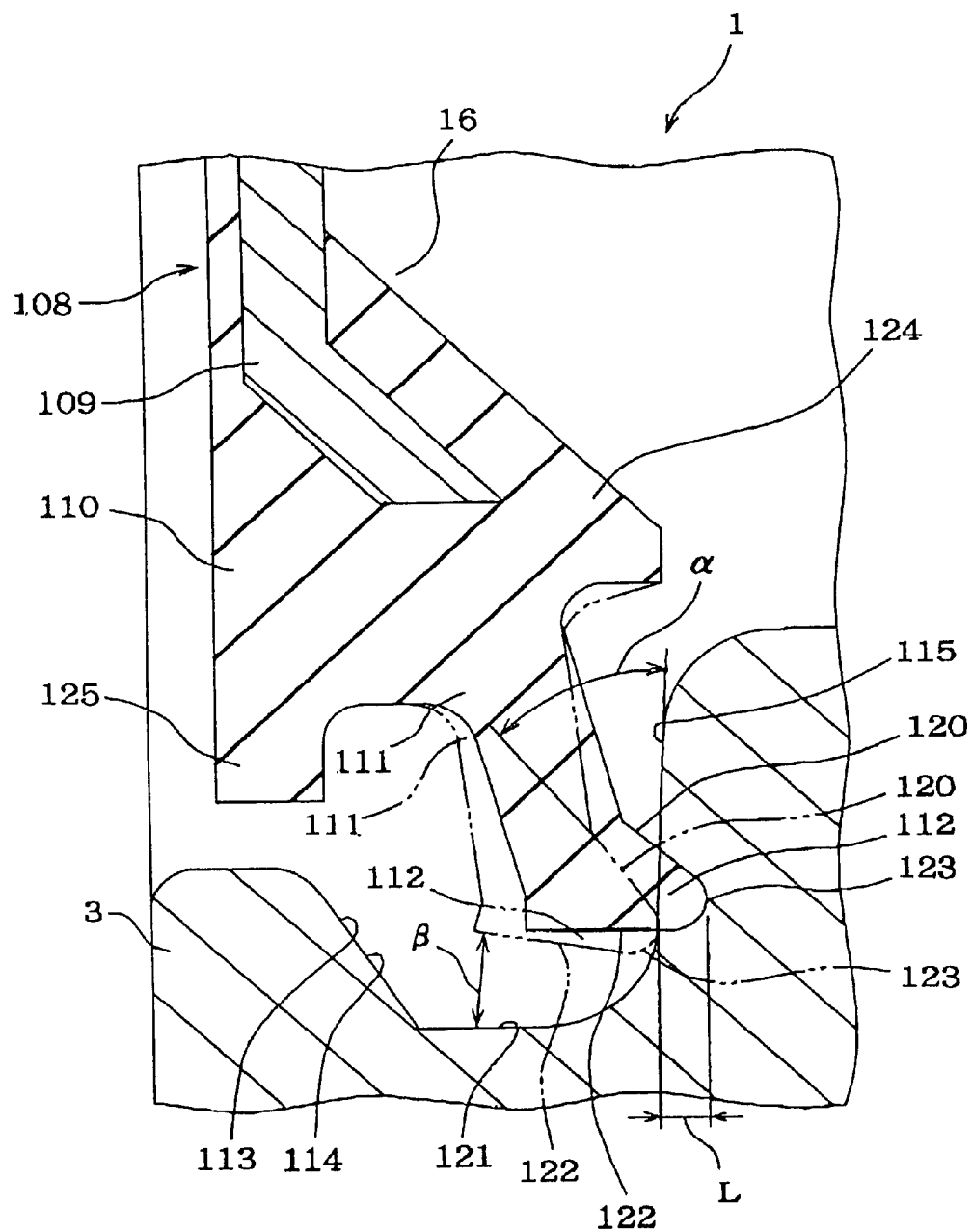
FIG. 38 is an enlarged view of the portion XXXVIII of FIG. 37.

An eleventh example of the embodiments of the invention is shown in FIGS. 37 and 38. This example of the present invention is characterized by tailoring the shape of the seal lip 111 on the inner peripheral edge of the elastic member 110 of the seal plate 8 in order to improve the seal performance of the seal plate 108. The basic structure of the rolling bearing 1 with seal plate itself is substantially the same as the prior art structure shown in FIGS. 7 and 8, so any explanations of identical parts will be omitted or simplified, and this explanation will center on the characteristic parts of this invention and those parts that are different from the prior art construction described above.

In the case of the seal plate 8 of the rolling bearing 1 with seal plate of this example, where a pair of wall surfaces 114, 115 are arranged in the axial direction (left and right in FIG. 37) to form a seal groove 113, the cross section of the end edge 112 of the seal lip 111 is formed substantially in a V shape, with the cross section of the axially inner wall surface 115 of the pair of wall surfaces 114, 115 being a arc-shaped concave surface. In other words, the end edge 112 of the elastic member 110 comprises an inclined surface 120 that faces the wall surface 115 and is inclined outward in the radial direction as it extends in the direction away from the wall surface 115, a cylindrical inner peripheral surface 122 that is located on the radially inside of the inclined surface 120 to face the bottom surface 121 of the seal groove 113, and formed in a cylindrical shape in a free state, and a curved surface 123 with an arc-shaped cross section that links the inclined surface 120 with the inner peripheral surface 122.

As shown by the dotted line in FIG. 38, when the outer peripheral edge of the seal plate 108, which comprises the seal lip 111 described above, is fitted into the seal groove 107 on the outer race 5, the seal lip 111 elastically deforms outward in the axial direction of the inner race 3, and the curved surface 123 comes in sliding contact with the wall surface 115 of the seal groove 113.

Also, when the curved surface 123 comes in contact with the wall surface 115 in this way, the angle α between the wall surface 115 and the inclined surface 120 becomes 10 to 45 degrees, or even better, becomes 30 to 40 degrees.

Moreover, the bottom surface 121 of the seal groove 113 and the inner peripheral surface 122 are parallel to each other or they are relatively inclined in a direction such that the space between them increases in the direction toward the outer end in the axial direction (toward the left side in FIGS. 37 and 38) of the inner race 3. In addition, the angle β between the bottom surface 121 of the seal groove 113 and the inner peripheral surface 122 is 0 to 30 degrees, or even better, 10 to 20 degrees.

Furthermore, interference (amount of elastic deformation) L in the axial direction between the edge 112 of the seal lip 111 and the wall surface 115 of the seal groove 113 is made to be 1 to 3% of the diameter of the balls 6. Also, when the force that the edge 112 is pressed against the wall surface 115 and that is obtained from the interference L due to the rigidity of the seal plate 108 is taken to be P, the elasticity and shape of the elastic member 110 is regulated such that P/L is 2.9 to 9.8 N/mm (300 to 1000 gf/mm).

A labyrinth seal is formed on the inner side of the seal lip 111 such that it is near and faces part of the surface of the inner race 3, and a grease seal lip 124 is formed for suppressing the amount of grease that reaches the area of the seal lip Moreover, a labyrinth seal is formed on the outer side of the seal lip 111 such that it is near and faces the outer peripheral surface of the inner race 3 at a place further outside than the seal groove 113, and a dust seal lip 125 is formed for suppressing the amount of foreign matter that gets into the seal groove 113.

In the case of the rolling bearing 1 with seal plate of this embodiment of the invention, the angle α between the wall surface 115 of the seal groove 113 and the inclined surface 120 that faces this wall surface 115 is 10 to 45 degrees, or even better, 30 to 40 degrees, so it is difficult for elastic deformation of the seal lip 111 due to a wedging action to occur even when the grease is pressed toward the seal groove 113 from the retainer that holds the balls 6, and thus it is difficult for a gap to occur between the seal lip 111 and the wall surface 115.

The reason the angle α is made to be 10 to 45 degrees, and even better, 30 to 40 degrees, is as described above.

Furthermore, the bottom surface 121 of the seal groove 113 and the inner peripheral surface 122 are parallel to each other or they are relatively inclined in a direction such that the space between them increases toward the outer end in the axial direction of the inner race 3, and such that the angle β between the bottom surface 121 of the seal groove 113 and the inner peripheral surface 122 that faces the bottom surface 121 is 0 to 30 degrees, or even better, 10 to 20 degrees, so any foreign matter that enters into the seal groove 113 and comes in contact with the inner peripheral surface 122 does not press the end edge 112 of the elastic member 110 in a direction that separates it from the wall surface 115.

Also, since there is a partial force applied to the foreign matter in the seal groove 113 due to contact with the inner peripheral surface 122 in a direction that leaves from the seal groove 113, it is difficult for foreign matter to stay inside the seal groove 113.

In addition, in the example shown in the figures, the curved surface 123 with the arc-shaped cross section comes in sliding contact with the wall surface 115 of the seal groove 113, so it maintains stable contact.

Furthermore, by regulating the interference L and pressing force P of the end edge 112 of the seal lip 111, it becomes even more difficult for elastic deformation of the seal lip 111 to occur, and thus further improves the seal performance.

Incidentally, it is possible to even more effectively maintain a good seal by using a retainer having construction that prevents grease from building up inside, such as disclosed in Japanese Patent Publication Toku Kai Hei 11-295823, for the retainer of the rolling bearing with seal plate of this invention,.

Figure 39:
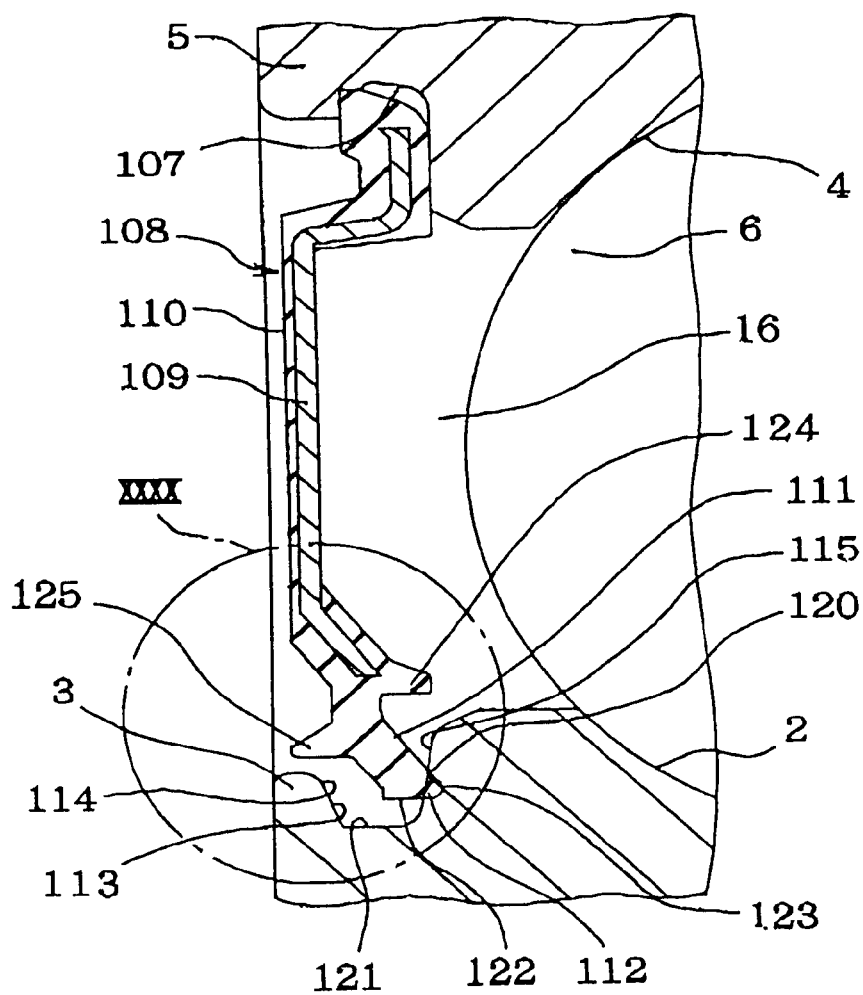
FIG. 39 is a cross sectional view of part of the retainer of a twelfth example of the embodiments of the retainer according to the present invention, where a ball is held therein.
Figure 40:
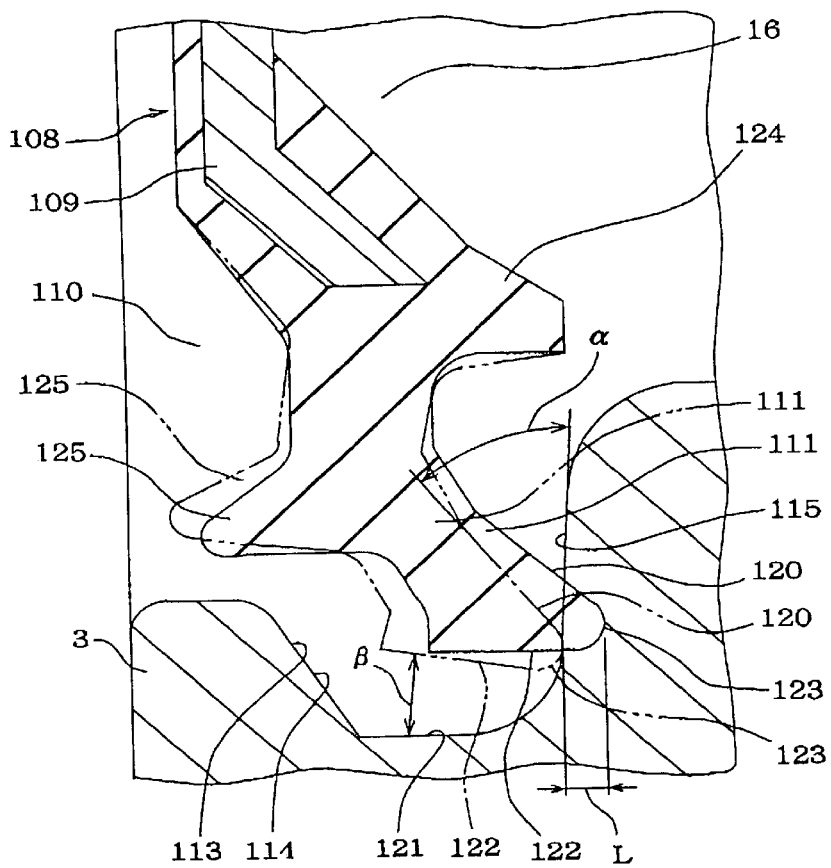
FIG. 40 is an enlarged view of the portion XXXXIII of FIG. 39.

Next, a twelfth example of the embodiment of the invention is shown in FIGS. 39 and 40. In this example, a dust seal lip 125 is formed on the outside of the seal lip 111 on the inner peripheral edge of the elastic member 110 of the seal plate 108 to protrude in the axial direction from the inner peripheral section on the outer surface of the seal lip 111 such that it covers the outside of the outer half of the opening of the seal groove 113. Except that the shape of the dust lip 125 is different and that the shape of the seal lip 111 is a little different to match it, the construction and functions of this embodiment are nearly the same as those of the eleventh embodiment described above.

Figure 7:
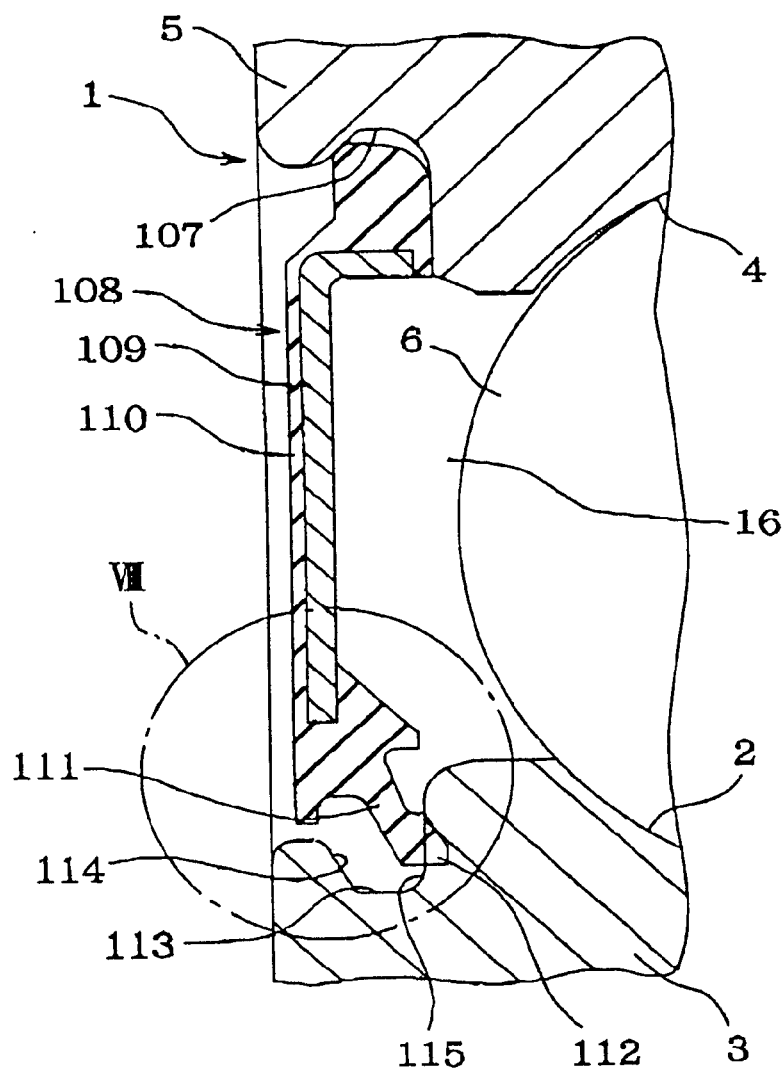
FIG. 7 is a cross sectional view of part of a conventional ball bearing.
Figure 8:
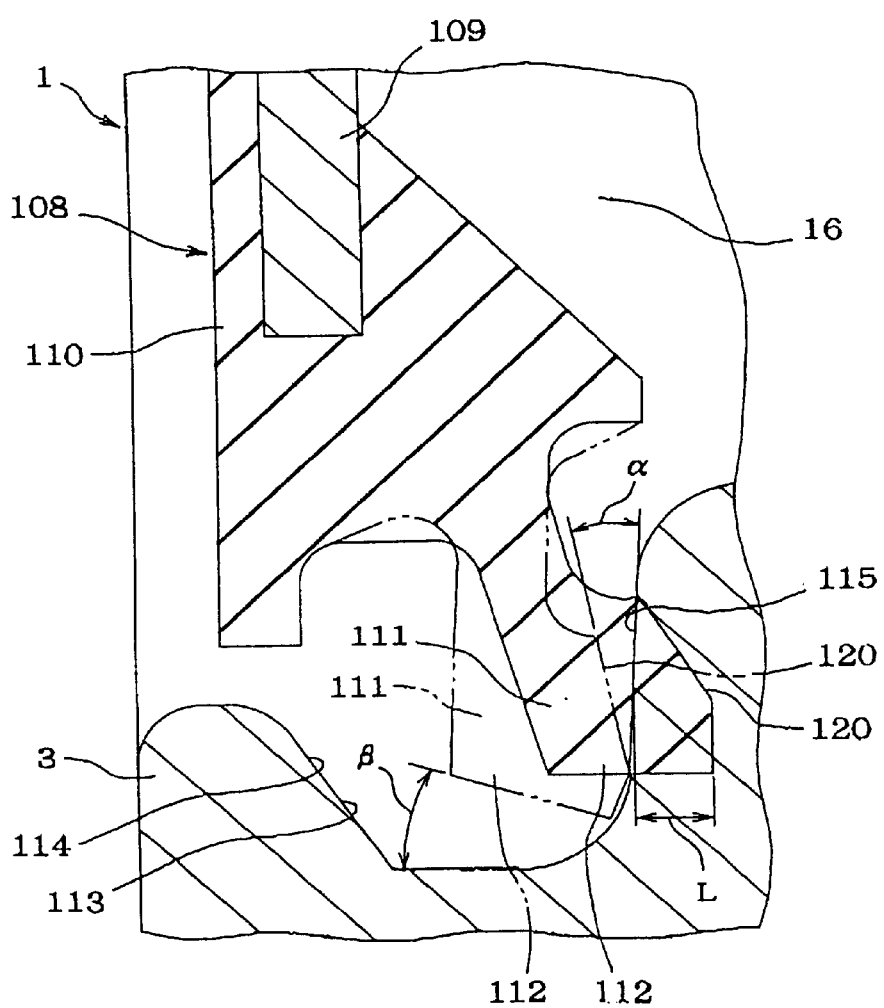
FIG. 8 is an enlarged view of Section VIII of FIG. 7.
Figure 9:
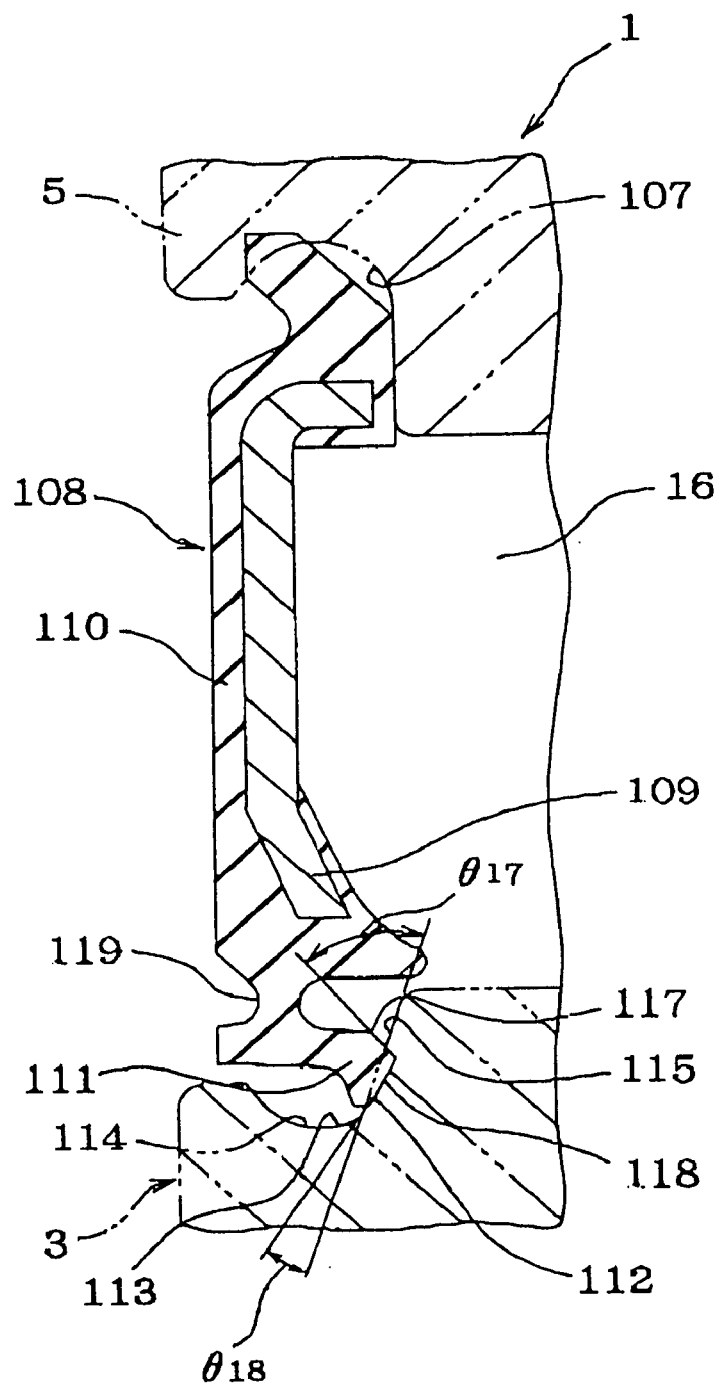
FIG. 9 is a cross sectional view of part of another conventional ball bearing.
Figure 10:
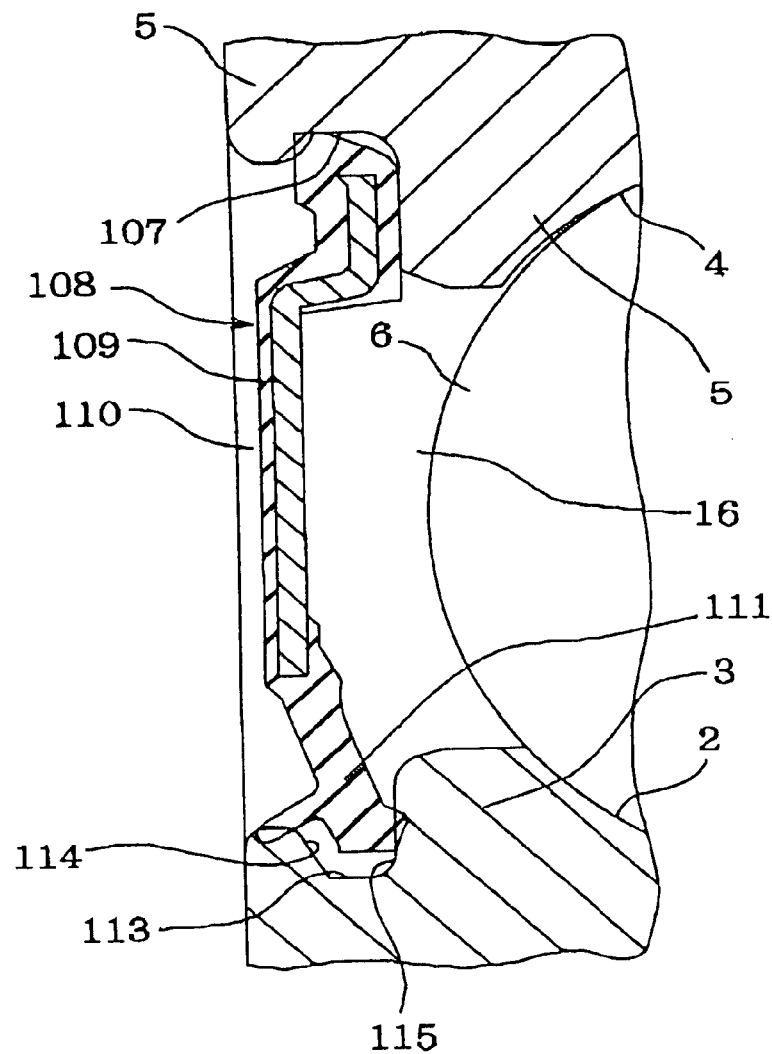
FIG. 10 is a cross sectional view of part of still another conventional ball bearing.
Figure 11:
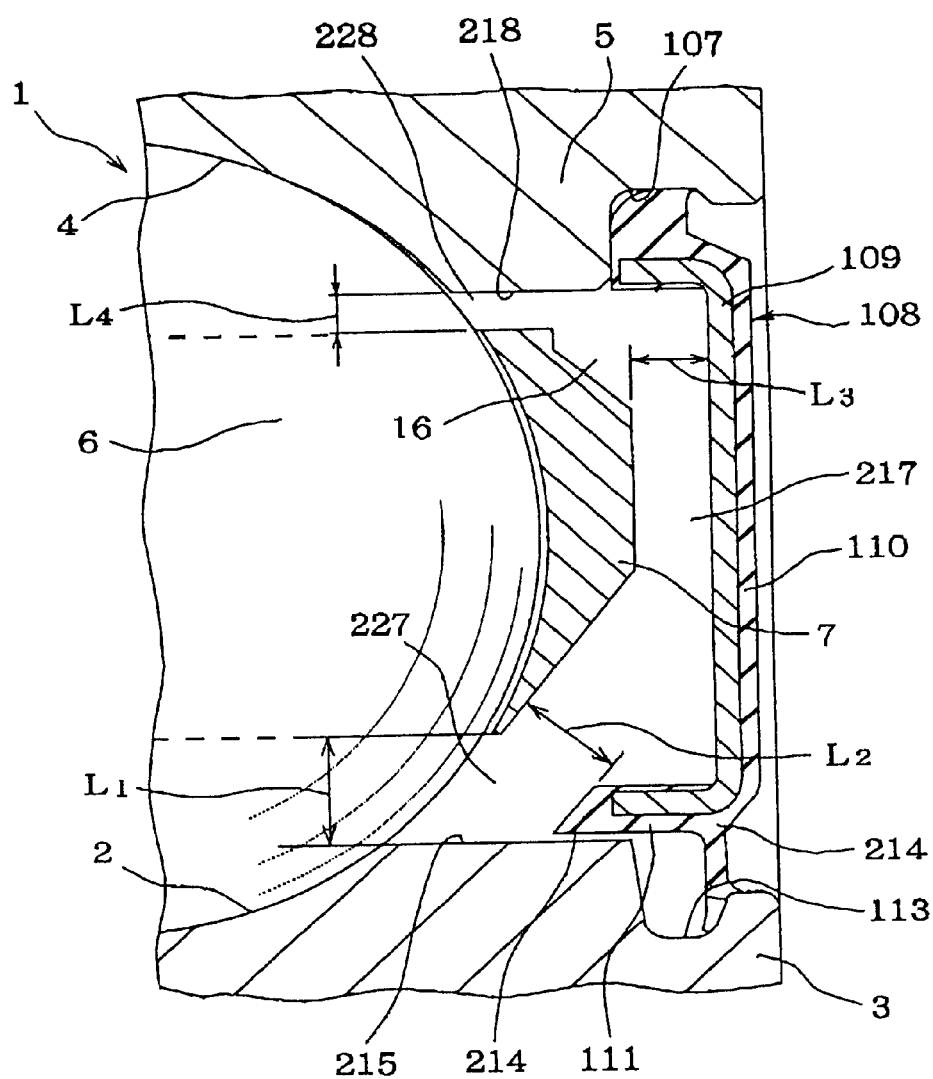
FIG. 11 is a cross sectional view of part of still another conventional ball bearing.
Figure 12:
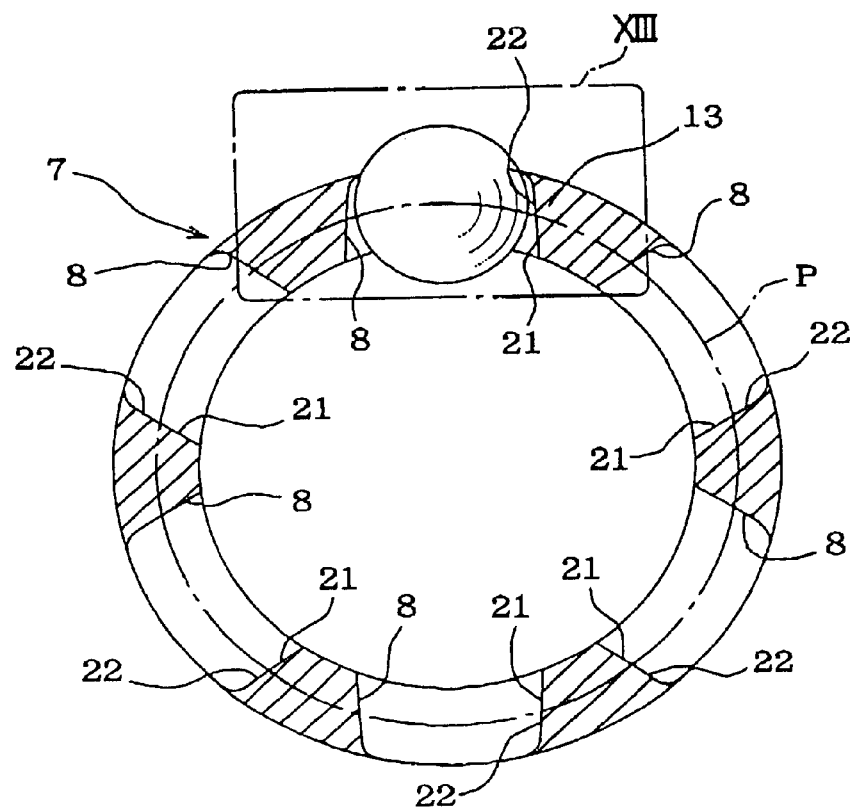
FIG. 12 is a cross sectional view of an example of the retainer according to the present invention where a ball is held therein, corresponding to the cross section taken by arrows in FIG. 2.
Figure 13:
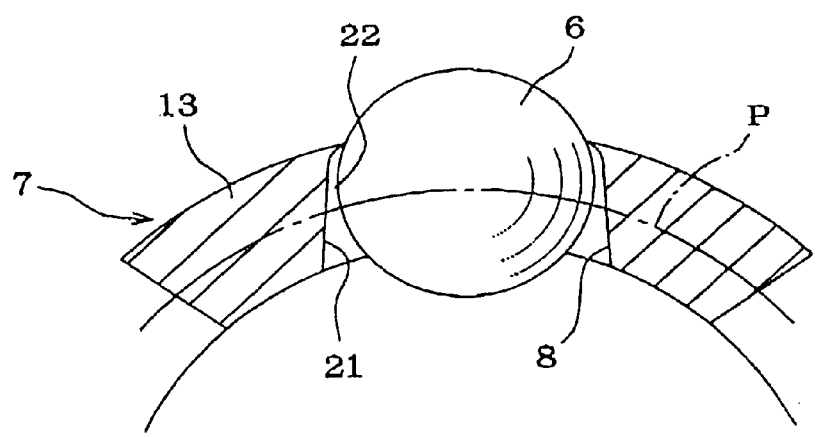
FIG. 13 is an enlarged view of Section XIII of FIG. 12.
Figure 43:
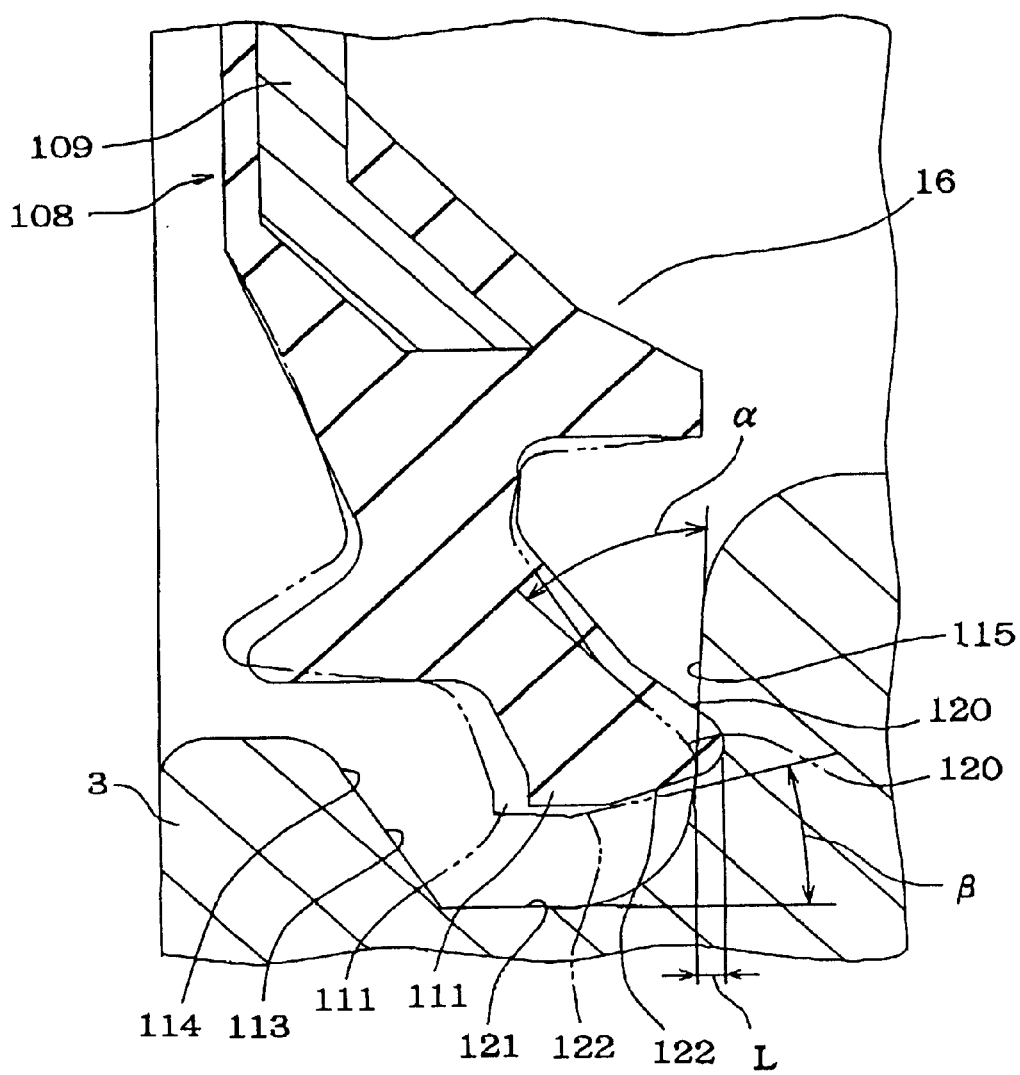
FIG. 43 is an enlarged view similar to FIG. 38 to show a comparative example to confirm the effects of the present invention.

A experimental test performed by the inventors to confirm the effect of the invention is explained below. In this test, the following examples were used under identical conditions, and the rate of grease leakage and the amount of water seepage were measured for comparison;

a conventional rolling bearing with the seal plate 108 shown in FIGS. 7 and 8 installed therein, Comparative Example I of a rolling bearing, in which a seal plate 108 was installed where the bottom surface 121 of the seal groove 113 and the inner peripheral surface 122 of the seal lip 111 were relatively inclined, as shown in FIG. 43, in a direction opposite that of this invention, such that the space becomes smaller toward the outer end in the axial direction of the inner race 3, Example I of the rolling bearing of this invention with the seal plate 108 shown in FIGS. 37 to 38 installed therein, and Example II of the rolling bearing of this invention with the seal plate 108 shown in FIGS. 39 and 40 installed therein.

Figure 41:
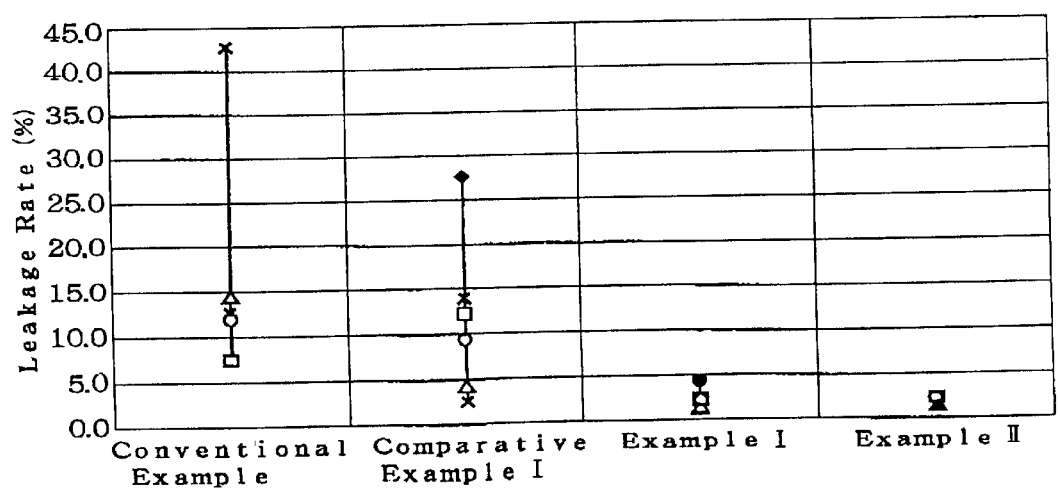
FIG. 41 is a graph to show results of a first experiment test conducted to confirm the effects of the present invention with respect to grease leakage.
Figure 42:
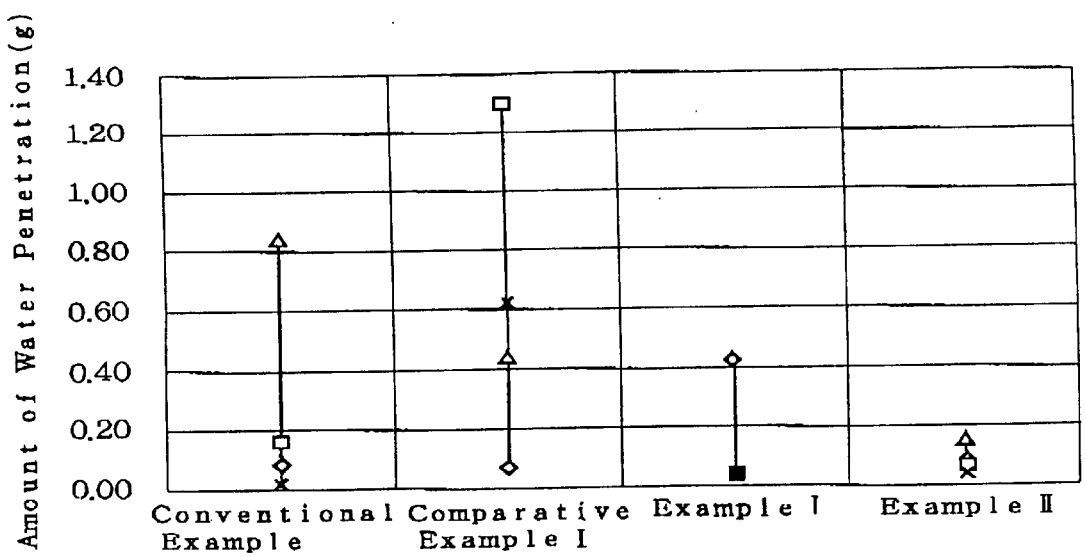
FIG. 42 is a graph to show results of an experiment test conducted to confirm the effects of the present invention with respect to water penetration.

The dimensions of the conventional example, Comparative Example I, Example I and Example II are shown in Table 1, and the measurement results for the grease leakage rate are shown in FIG. 41, and the measurement results for the water seepage are shown in FIG. 42.

The test was performed on eight samples of like example for measuring the grease leakage rate, for a total of 32 samples, and on four samples of like example for measuring the amount of water seepage, for a total of 16 samples.

the pair of seal grooves 107. Of this pair of seal plates 108, the inner surface of the middle section in the axial direction of one seal plate 108 (right seal plate in FIG. 44) faces the surface on the one axial side (right side surface in FIG. 44) of the retainer 7.

Figure 45:
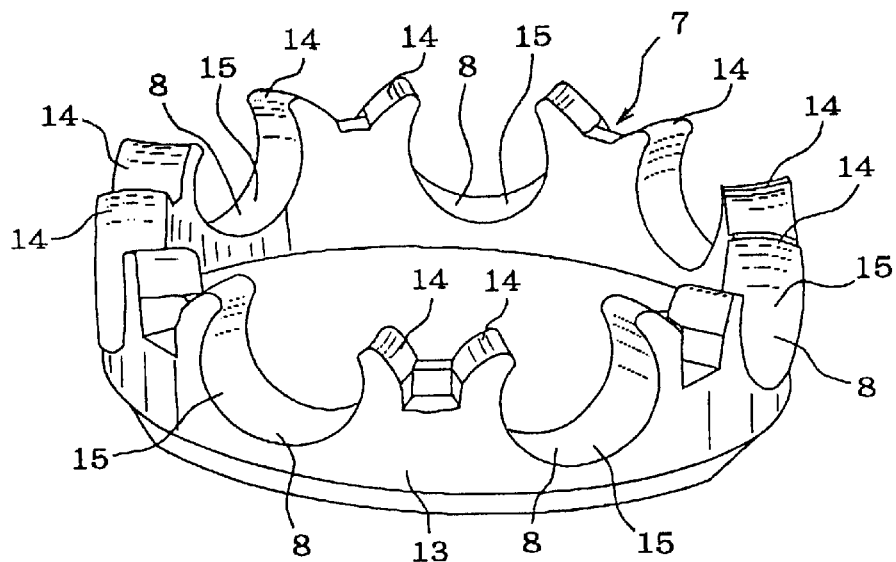
FIG. 45 is a perspective view of a retainer of the thirteenth example.

The retainer 7 is called a crown-shaped retainer, and as shown in detail in FIG. 45, and made entirely of synthetic resin or the like, and comprises a ring-shaped main section 13 and a plurality of plastic pieces 14 that are formed all the way around the circumference of the other side (top side in FIG. 45) in the axial direction of the ring-shaped main section 13 and protrude in the axial direction with a space between them. In the case of this retainer 7, pockets 8 are formed from the side surfaces of a pair of elastic pieces 14 and a spherical concave surface 15 that is formed on the surface on the other side in the axial direction of the main section 13 in the part between the pair of elastic pieces 14 so as to hold the balls 6 such that they each roll freely.

In this embodiment, inclined guide surfaces 223 with straight cross section are formed all the way around circumference on both edges in the radial direction on one side in the axial direction (bottom side in FIG. 45) of the retainer 7.

Each seal plate 108 comprises a core 109 that is made by forming metal sheet, such as a steel plate, into a ring shape, and an elastic member 110 that is made of an elastomer such

TABLE 1

|  | Conventional Example | Comparative Example 1 | Example I | Example II |
| --- | --- | --- | --- | --- |
| Interference L | 0.26 mm | 0.08 mm | 0.13 mm | 0.13 mm |
| Rate of Interference L to Ball Diameter |  3.3% | 1.0% | 1.6% | 1.6% |
| during halt | 2.3 N/mm | 10.4 N/mm | 4.6 N/mm | 4.4 N/mm |
| P/L | (230 gf/mm) | (1060 gf/mm) | (470 gf/mm) | (450 gf/mm) |
| during-operation | 2.6 N/mm | 11.4 N/mm | 5.0 N/mm | 4.9 N/mm |
|  | (270 gf/mm) | (1160 gf/mm) | (510 gf/mm) | (500 gf/mm) |
| $\alpha$ | about 9.5° | about 40° | about 36° | about 37° |
| $\beta$ | about 24.5° | about 14° | about 14° | about 11° |

As can be clearly seen from the results of the test performed under these conditions, shown in FIGS. 41 and 42, with the rolling bearing with seal plate of this invention, prevention of grease leakage and the prevention of foreign matter getting into the bearing are good, and the durability of the bearing is improved.

The rolling bearing with seal plate of this invention, constructed and functioning as described above, effectively prevents grease leakage as well as prevents foreign matter from getting inside the bearing, and contributes to the improvement of reliability and durability of devices equipped with the rolling bearing with seal plate.

Figure 44:
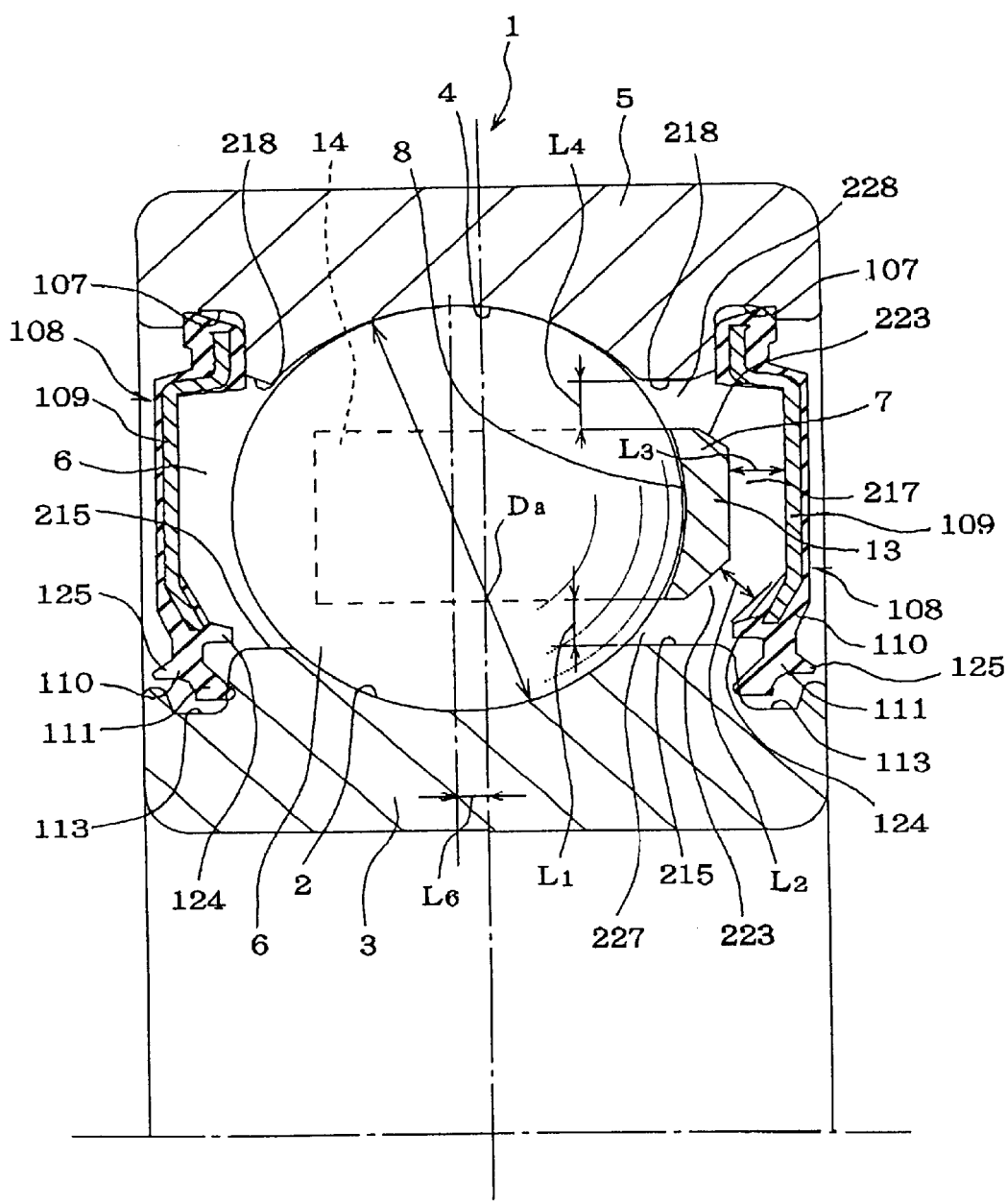
FIG. 44 is a cross sectional view of a half of a ball bearing to show a thirteenth example of the embodiments of the present invention.

A thirteenth example of the embodiments of the invention is shown in FIGS. 44 and 45. Similar to the prior art construction, the ball bearing 1 with seal plate of this example, comprises an inner race 3 that has a deep-groove type inner-race track 2 formed around its outer peripheral surface, an outer race 5 that is concentric with the inner race 3 and that has a deep-groove type outer-race track 4 formed around its inner peripheral surface, and a plurality of balls 6 that are rollably located between the inner-race track 2 and outer-race track 4. These balls 6 are held in a ring-shaped retainer 7 such that they can turn freely. Moreover, a pair of seal grooves 107 are formed all the way around the inner peripheral surface on both ends of the outer race 5, and the outer peripheral edges of ring-shaped seal plates 108 fit into as rubber, such that a seal lip 111 is formed around the inner peripheral edge of the elastic member 110. The end edge of this seal lip 111 comes in sliding contact with the wall surface on the axially inside of a seal groove 113 that is formed around the outer peripheral surface on both ends of the inner race 3.

A labyrinth seal is formed on the inside of this seal lip 111 to come near to and faces the outer peripheral surface on part of the inner race 3, and a grease seal lip 124 is formed for suppressing the amount of grease that reaches the end edge of the seal lip 111.

In addition, a labyrinth seal is formed on the outside of the seal lip such that it is near and faces the outer peripheral surface of part of the inner race 3 in the part further outside from the seal groove 113, and a dust seal lip 125 is formed for suppressing the amount of foreign matter that gets inside the seal groove 113.

Moreover, in this example, part of the elastic member 110 defining a radially outer side surface of the grease seal lip 124 is inclined radially outward in the axially outer direction.

Particularly, in this example of the present invention, the relationship between the dimensions of all of the parts of the ball bearing 1 with seal plate are regulated as described below.

The figures show the elastic member 110 in the free state, however, the dimensions are regulated in the state when the seal plate 108 is installed with part of the elastic member 110 elastically deformed (operating state).

First, the size in the radial direction of the radially inner ring-shaped gap 227 between a radially inner shoulder section 215, that is formed on the outer peripheral surface of the inner race 3 in the part that is adjacent to the outer side in the axial direction of the inner-race track 2 at a radius greater than the radius of the inner-race track 2, and the inner peripheral surface of the retainer 7, that faces this radially inside shoulder section 215, is taken to be $L_1$.

Also, the size of the radially inner end of a ring-shaped gap 217, that is formed between the surface on the one axial side of the retainer 7 and the axially inner surface of one of the seal plates 108 (right seal plate in FIG. 44), is taken to be $L_2$.

In addition, the size in the axial direction of the middle section in the radial direction of the ring-shaped gap 217 is taken to be $L_3$.

Moreover, the size in the radial direction of a radially outer ring-shaped gap 228 that is formed between an outer shoulder section 218 that is formed on the inner peripheral surface of the outer race 5 at the portion adjacent to the axially outer side of the outer-race track 4 and smaller in diameter than the outer-race track 4, and the outer peripheral surface of the retainer 7 that faces this outer shoulder section 218, is taken to be $L_4$.

Furthermore, the diameter of the ball 6 is taken to be $D_a$.

Moreover, in this example of the invention, the dimensions of each of the parts of the ball bearing 1 with seal plate are regulated such that $L_1 \leq L_2 \leq L_3$, $1.5\ L_1 \leq L_3$ or $0.09\ D_a \leq L_3$, and $L_1 \leq L_4$.

Also, in this example, in order to regulate the dimensions of these specified parts in this way, the inner-race track 2, outer-race track 4 and balls 6 arc offset a specified size $L_6$ in a direction (left direction in FIG. 44) such that they are separated from the main section 13 of the retainer 7 more than the center section in the axial direction of the inner race 3 and outer race 5.

In this example, the main section 13 of the retainer 7 exists only on one side (right side in FIG. 44) in the axial direction of the ball 6, however by satisfying the above conditions, without increasing the entire length of the ball bearing 1 with seal plate, it is possible to keep the size $L_2$ on the radially inner end of the ring-shaped gap 217 and the size $L_3$ in the axial direction of the radially middle section at the values specified above or greater.

With the ball bearing with seal plate of the embodiments of invention described above, it is possible to adequately prevent grease, that is filled inside the space 16 where the balls 6 are located, from leaking out to the outside. In other words, in the embodiments of the invention, the relationship between the dimensions of each part of the ball bearing 1 with seal plate are properly regulated as described above, such that the cross-sectional area of the section that is to be the path for the grease inside this ball bearing with seal plate becomes larger towards the outside. Therefore, it becomes difficult for the grease on the inside of the retainer 7 to be blocked as it flows through the ring-shaped gap 217 to the outer side of the retainer 7. Also, it is possible to sufficiently prevent this grease from building up on the inside of the retainer 7 and to prevent part of this built up grease from leaking out between the seal groove 113 formed on the outer peripheral surface on the end of the inner race 3 and the end edge of the seal lip 111 of the seal plate 108.

The reasons that the size $L_3$ in the axial direction of the center section in the radial direction of the ring-shaped gap 217 is greater than $1.5 L_1$ or 0.09 Da are described below.

In the case that the minimum size $L_3$ is less than $1.5 L_1$ ($L_3 < 1.5 L_1$), the flow of the grease inside the retainer 7 to the outside is not performed smoothly enough, even when the minimum size $L_3$ is greater than or equal to $L_1$ ($L_1 \leq L_3$), and thus the prevention of grease leakage is still not sufficient. Also, in the case of the small-diameter, deep-groove ball bearing of this invention, the value $1.5 L_1$ is generally nearly equal to the value $0.09 D_a$ ($1.5 L_1 = 0.09\ D_a$). Therefore, in this invention, the minimum size $L_3$ can be regulated to be greater than either $1.5 L_1$ or $0.09 D_a$.

Moreover, in this embodiment, an inclined guide surface 223 is formed on both edges in the radial direction on the axially outer surface of the retainer 7, and furthermore, the radially outer wall surface of the grease seal lip 124 on part of the plastic member 110 of the seal plate 108 is inclined further outward in the radial direction as it extends outward in the axial direction. Therefore, in the case that grease inside the retainer 7 is pressed toward the outside in the axial direction, it becomes easy for this grease to flow to the outside.

In the case of the crown-shaped retainer 7 of this embodiment, much grease is pressed out from the radially inside of the retainer 7, that is from the side where the main section 13 is located, so it is especially necessary to consider the flow of grease to the outside on the same side as the main section 13, and it is not especially necessary to consider the flow of grease to the outside on the opposite side of the main section 13.

Figure 46:
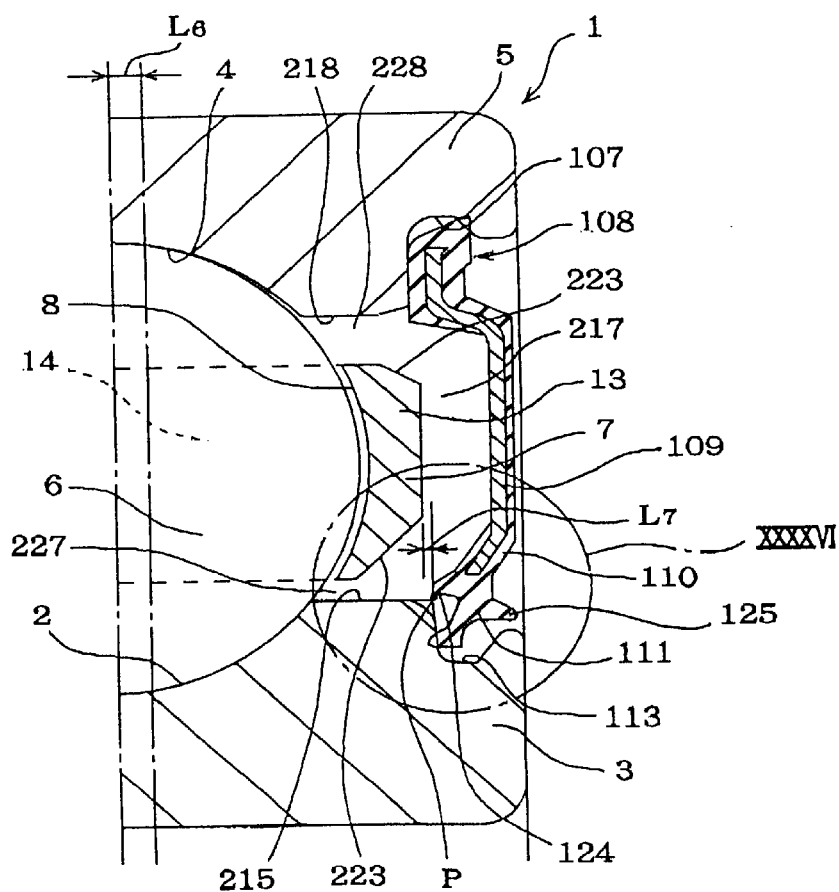
FIG. 46 is a cross sectional view of part of a ball bearing to show a fourteenth example of the embodiments of the present invention.
Figure 47:
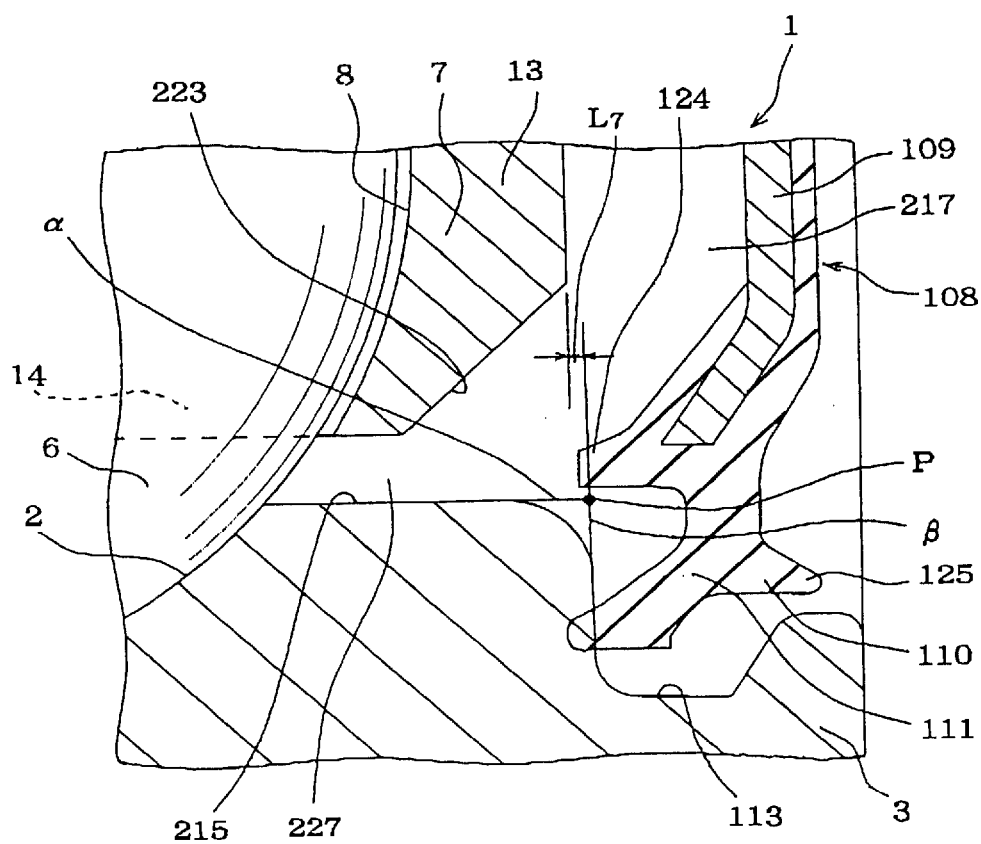
FIG. 47 is an enlarged view of Portion XXXXVII of FIG. 46.

Next, a fourteenth example of the embodiments of the invention is shown in FIGS. 46 and 47. In this example, an inner shoulder section 215 is formed in the section that is adjacent to the outer side in the axial direction of the inner-race track 2 on the outer peripheral surface of the inner race 3, and a seal groove 113 is formed in the section adjacent on the outer side in the axial direction to the radially inner shoulder section 215 on the outer peripheral surface of the inner race 3, and when the ball bearing 1 with seal plate is seen from a cross section which includes the center axis of the inner race 3 and outer race 5, the line a that extends from the outer peripheral surface (the generatrices) of the inner shoulder section 215 intersects with the line β (see FIG. 47) that extends from the wall surface on the axially inside of the seal groove 113 at a point P.

With respect to the axial direction of the inner race 3 and retainer 7, this intersection P is not located further inside in the axial direction than the surface on one side (right side in FIGS. 46 and 47) in the axial direction of the retainer 7. In other words, the intersection P is located on the outside in the axial direction from the surface on one side in the axial direction of the retainer 7 by a distance $L_7 (\geq 0)$.

Also, in this example, the inner-race track 2, outer-race track 4 and balls 6 are offset a specified length $L_6$ in a direction (left direction in FIGS. 46 and 47) such that they are separated from the main section 13 of the retainer 7 more than the center section in the axial direction of the inner race 3 and outer race 5.

In this example of the invention, constructed as described above, it is difficult for the grease to pressed into the seal groove 113 even when the grease inside the retainer 7 is pressed to the outside in the axial direction.

In other words, the grease that is pressed outward in the axial direction tends to flow along the seal groove 113 and the side of the retainer 7 due to the viscosity of the grease. In the ball bearing 1 with seal plate of this example, the position relationship, in the axial direction of the inner race 3 and the retainer 7, of the intersection P with respect to the axially inner wall surface of the seal groove 113, and the surface on one side in the axial direction of the retainer 7, is regulated as described above.

Therefore, it becomes easier for the grease that is pressed outward in the axial direction from the inside of the retainer 7 to flow along the surface on the one axial side of the retainer 7 than along the axially inner wall surface of the seal groove 113. In addition, centrifugal force due to the rotation of the retainer 7 and seal plate 108 is applied to the grease during operation of the ball bearing 1 with seal plate, and consequently it becomes difficult for the grease that is pressed out in the radial direction from inside the retainer 7 to move inside the seal groove 113, and thus it is possible to sufficiently prevent the grease from leaking out between the outer peripheral surface on the end of the inner race 3 and the seal plate 108.

It is also possible for the intersection P to be located at nearly the same location as the surface on the one axial side of the retainer ($L_7=0$) with reference to the axial direction of the inner race 3 and retainer 7. In this case as well, it becomes difficult for the grease that is pressed out in the radial direction from inside the retainer 7 to move inside the seal groove 113.

However, in the case of this embodiment, in order to better prevent grease leakage, it is better for the intersection P to be located further outside in the axial direction of the inner race 3 and retainer 7 than the surface on the one axial side of the retainer 7.

The other construction and functions of this example are substantially the same as those of the thirteenth example described above, so the same symbols are used for identical parts, and any redundant explanation is omitted.

Figure 48:
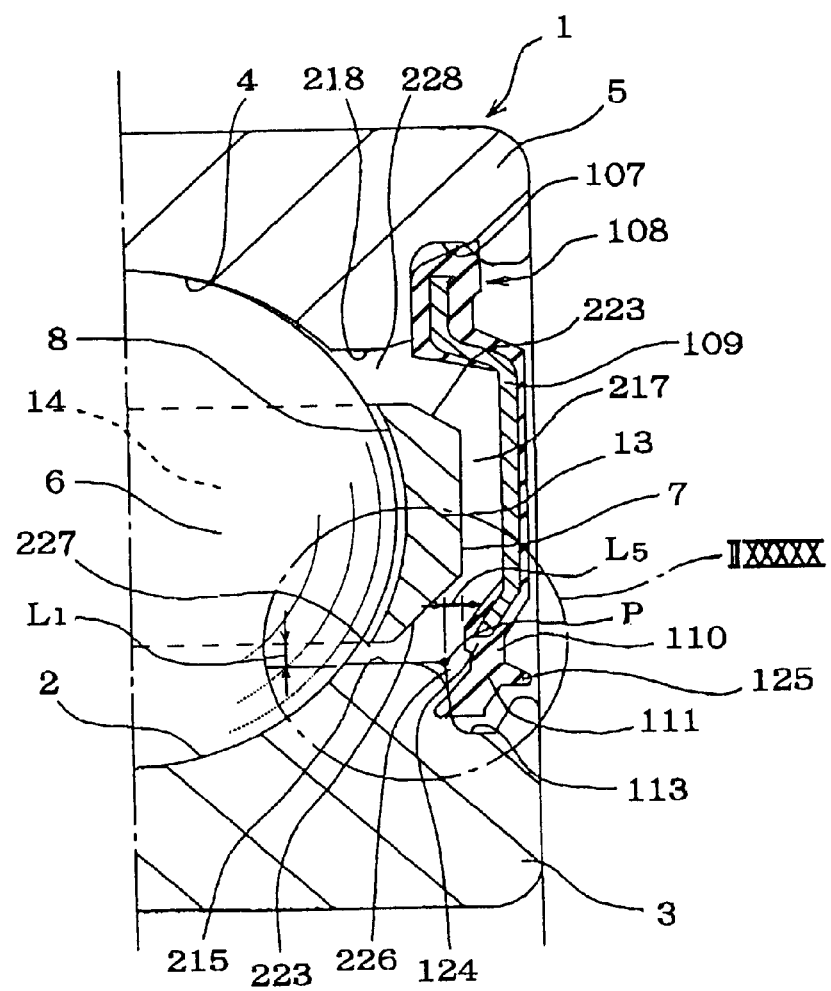
FIG. 48 is a cross sectional view of part of a ball bearing to show a fifteenth example of the embodiments of the present invention.
Figure 49:
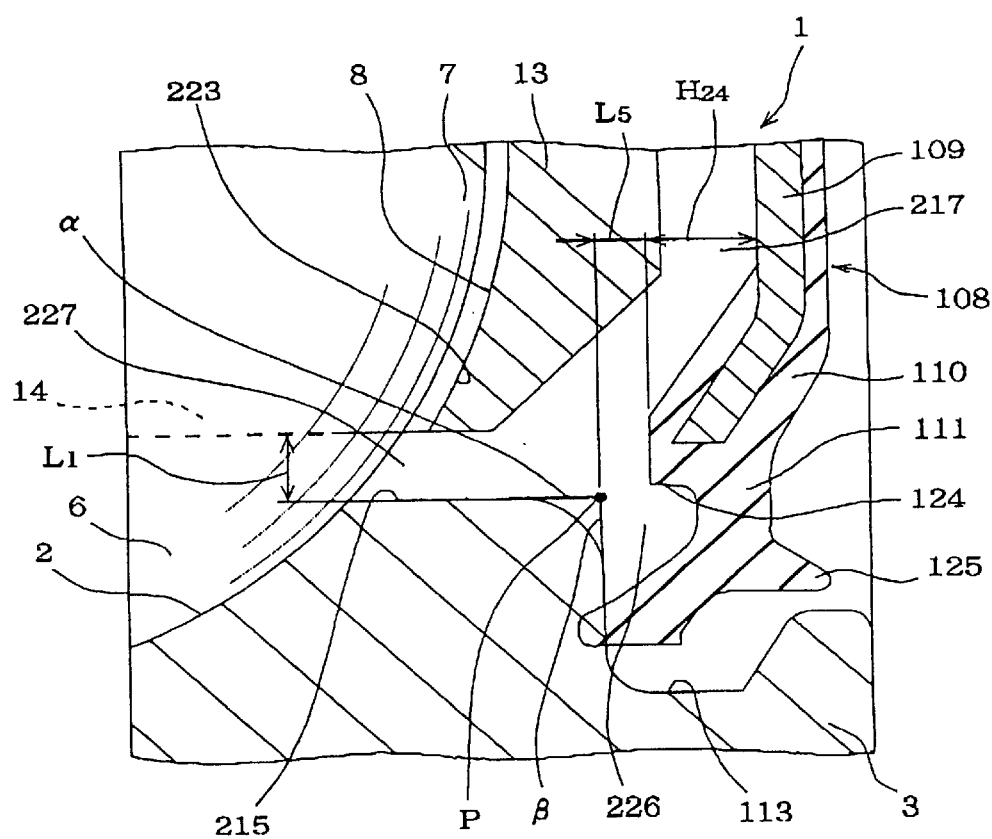
FIG. 49 is an enlarged view of Portion IIXXXXX of FIG. 48.

Next, a fifteenth example of the embodiments of the invention is shown in FIGS. 48 and 49. In this example, a grease seal lip 124 is formed in the section on the radially inside of the seal plate 108 for suppressing the amount of grease that enters inside the seal groove 113, and the height $H_{24}$ of the grease lip 124 is lower than the height of the grease seal lips 124 (see FIGS. 44, 46 and 48) used in the other embodiment described above.

Also, in this example, similar to the fourteenth example described above, when looking at the cross section of the ball bearing 1 with seal plate that includes the center axis of the inner race 3 and the outer race 5, the line a that extends from the outer peripheral surface (generatrices) of the radially inner shoulder section 215, intersects the line β that extends from the wall surface (generatrices) on the axially inner side of the seal groove 113 that is formed adjacent to the axially outside of the radially inner shoulder section 215 on the outer peripheral surface of the inner race 3, at an intersection point P.

Also, similar to the thirteen example described above, the thickness in the radial direction of the inner ring-shaped gap 227 between the radially inner shoulder section 215, that is formed in the section adjacent to the axially outer side of the inner-race track 2 on the outer peripheral surface of the inner race 3, and the inner peripheral surface of the retainer 7, that faces this radially inner shoulder section 215, is taken to be $L_1$.

Moreover, in this example, the grease seal lip 124 has its end edge formed at the portion near the inner periphery of the seal plate 108 the closest to the intersection P to form a gap 226 between the intersection P and the end edge of the grease seal lip 124, and the size $L_5$ of the gap 226 in the axial direction of the inner race 3 and the seal plate 108 is such that $0.5L_1 \leq L_5 \leq L_1$.

With the ball bearing with seal plate of this example, constructed as described above, when grease enters inside the seal groove 113 through the gap 226 between the end edge of the grease seal lip 124 formed on the portion near the inner periphery of the seal plate 108 and the end edge of the seal groove 113, while a centrifugal force acts on the grease inside the seal groove 113 during operation of the ball bearing with seal plate due to the rotation of the retainer 7 and seal plate 108, it becomes easy for the grease to be discharged to the radially outside from the inside of the seal groove 113.

Furthermore, in this example, it is possible to make the inner peripheral edge of the grease seal lip 124 smaller, thus it is possible to make it more difficult to keep grease near this inner edge.

As a result, in the case of this example, after the grease is inside the seal groove 113, it does not remain inside the seal groove 113, and it is possible to adequately prevent the grease from leaking out between the outer peripheral surface on the end of the inner race 3 and the seal plate 108.

Incidentally, when the size $L_5$ in the axial direction of the gap 226 is less than $0.5L_1$, it is not possible to adequately discharge the grease in the seal groove 113 to the outside through the gap 226. On the other hand, when the size $L_5$ in the axial direction of the gap 226 is larger than $L_1$, then it becomes too easy for the grease that is pressed outward in the axial direction from the inside of the retainer 7 to move inside the seal groove 113. Therefore, in this example, the size $L_5$ in the axial direction of the gap 226 is regulated as described above.

The other construction and functions of this example are substantially the same as the thirteenth example described above, so the same symbols are used for identical parts, and any redundant explanation is omitted.

Next, further tests that were performed by the inventors to confirm the effect of the invention are explained.

Figure 50:
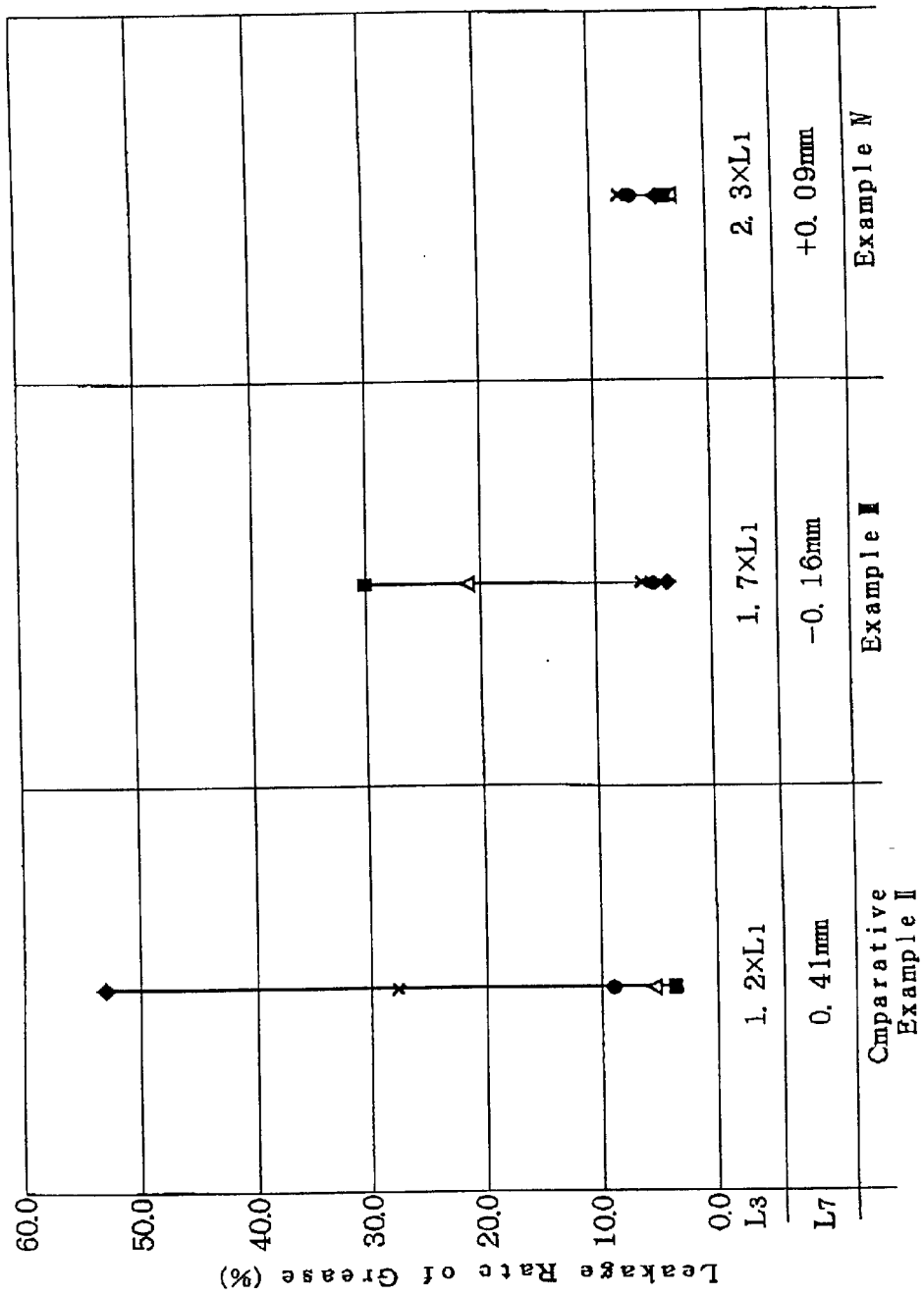
FIG. 50 is a graph to show results of a second experiment test conducted to confirm the effects of the present invention with respect to grease leakage.

In the first test, Examples III and IV of the invention, and Comparative Example II were used under identical conditions, after which, the leakage rate of grease was measured for each. FIG. 50 shows the size of the $L_3$ and $L_7$ in the example III and IV of the invention and Comparative Example II, and the measurement results of the grease leakage of each.

In FIG. 50, when the size $L_7$ is positive, it indicates that the intersection P with respect to the wall surface on the axially inner side of the seal groove 113 is located further on the outside in the axial direction than the surface on the axially one side of the retainer 7 (see FIG. 46 and 47), and when the size $L_7$ is negative, it indicates that the intersection P is located further on the inside in the axial direction than the surface on the axially one side of the retainer 7.

As can be clearly seen from FIG. 50, Examples III and IV of the present invention greatly reduce the rate of grease leakage when compared with Comparative Example II.

Figure 51:
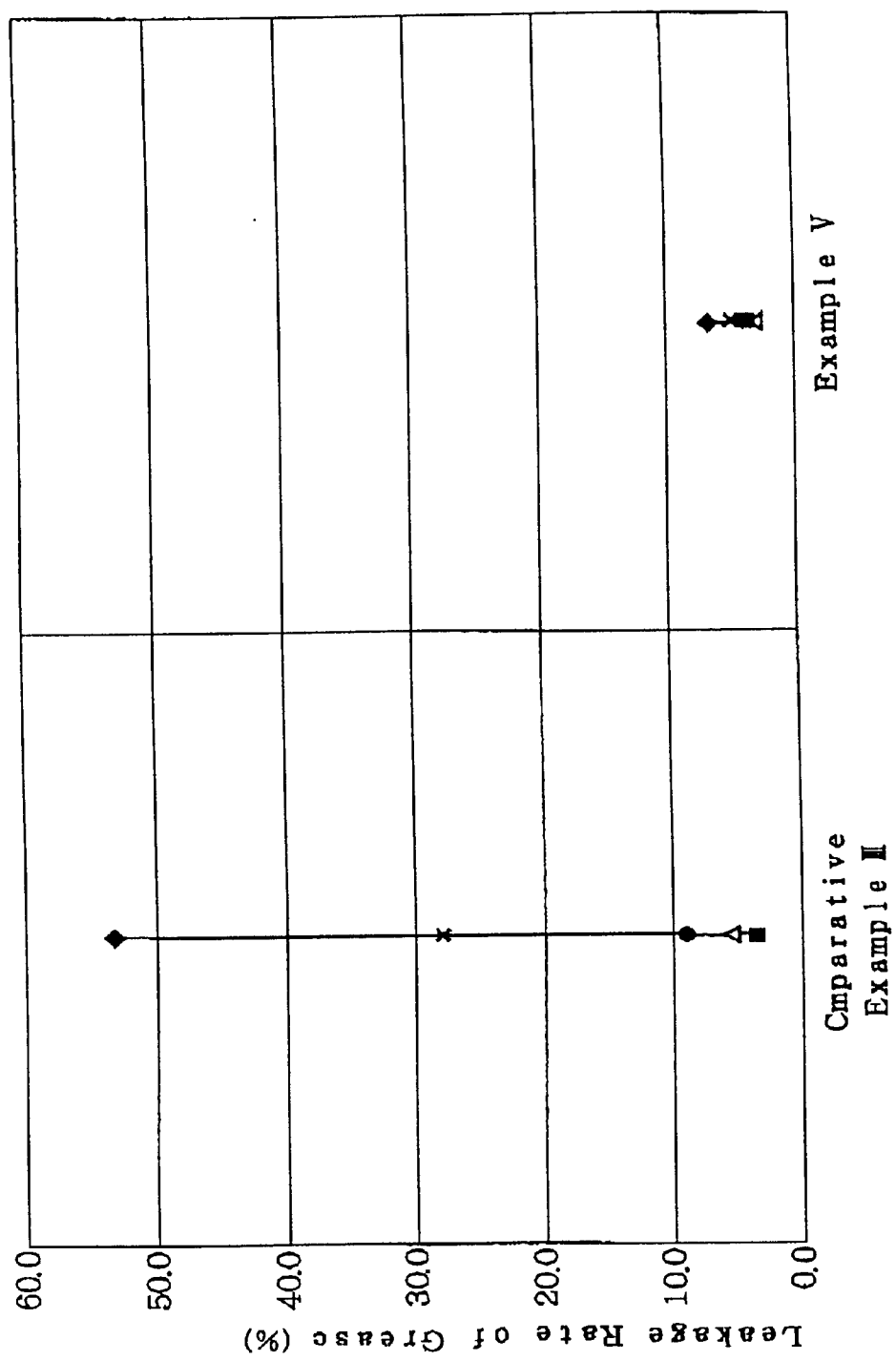
FIG. 51 is a graph to show results of a third experiment test conducted to confirm the effects of the present invention with respect to grease leakage.

In the next test, Example V of the invention and Comparative Example III were used under identical conditions, after which, the leakage rate of grease was measured for each. FIG. 51 shows the measurement results of the grease leakage of Example V of the invention and Comparative Example III. As can be clearly seen from FIG. 51, Example V of the invention greatly reduces the rate of grease leakage when compared with Comparative Example III.

The points of this invention as shown in the examples can be worked independently or can be combined and worked. Furthermore, it is possible to combine this invention with the retainer disclosed, for example, in Japanese Patent Application No. H11-295823, which makes it difficult for grease to leak out by making it difficult for grease to build up inside the retainer, or with the seal lip disclosed in Japanese Patent Application No. H11-325301, which is shaped such that it is difficult for grease to leak out.

The ball bearing with seal plate of the embodiments of this invention, constructed and functioning as described above, effectively prevents grease leakage as well as prevents foreign matter from getting inside the bearing, and contributes to the improvement of reliability and durability of devices equipped with the ball bearing with seal plate.

In the present invention, it should be understood that the diameter of the maximum inscribed circle of the openings of the pockets means the maximum for the diameter of the hypothetical circles defined with contact points between the outer surface of the ball and the inner surface of the pocket when the ball comes into contact with the inner surface of the pocket at the inner periphery edge of the opening.

Figure 14:
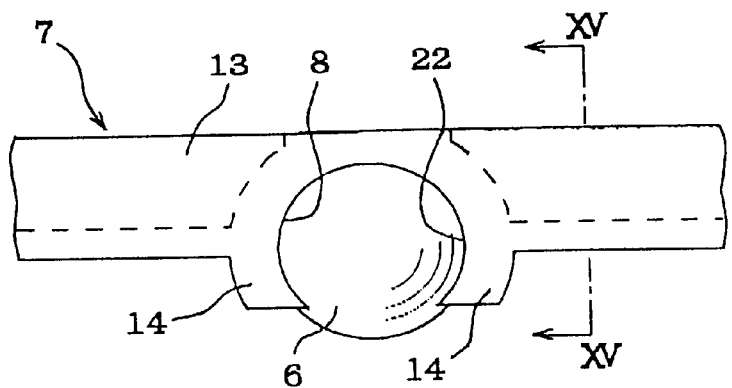
FIG. 14 is a top plan view of the portion shown in FIG. 13.
Figure 15:
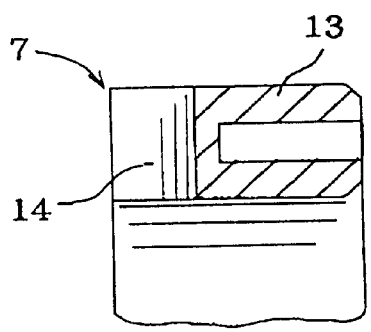
FIG. 15 is a cross sectional view taken along the line XV—XV of FIG. 14.

In FIGS. 14 and 15, although the outer surface of the elastic pieces 14 appear in a cylindrical form, but they are also formed in a barrel shape in another embodiments.

What is claimed is:

1. A rolling bearing comprising an inner race having an outer peripheral surface formed with an inner-race track and a seal groove formed in the outer peripheral surface at an axial end thereof, the seal groove having a wall surface and a bottom, an outer race having an inner peripheral surface formed with an outer-race track and an seal groove formed at an axial end thereof, such that a space is formed between the outer peripheral surface of the inner race and the inner peripheral surface of the outer race, a plurality of rolling elements rollably provided between the inner-race track and the outer-race track in the space, and a seal plate formed in a generally annular shape, comprising an elastic member and a core metal for reinforcing, and having an outer peripheral edge fitted in the seal groove generally in the inner peripheral surface of the outer race and an inner peripheral edge defined by the end edge of the elastic member in sliding contact with the wall surface of the seal groove in the outer peripheral surface, the end edge of the elastic member comprising an inclined side surface opposing the wall surface of the seal groove, an inner peripheral surface located radially inward of the inclined side surface and opposing the bottom of the seal groove, and a continuation portion for continuously connecting the inclined side surface with the inner peripheral surface of the end edge, the continuation portion being in sliding contact with the wall surface of the seal groove, the angle between the wall surface of the seal groove and the inclined side surface of the end edge being in the range from 10 degrees to 45 degree in the state where continuation portion is in contact with the wall surface, the bottom of the seal groove being in parallel to the inner peripheral surface of the end edge or being inclined relative to the inner peripheral surface of the end edge such that the gap between the bottom of the seal groove and the inner peripheral surface of the end edge increases toward the axially outer end of the inner race, and the angle between the bottom of the seal groove and the inner peripheral surface of the end edge being in the range from 0 degrees to 30 degrees, wherein the rolling elements are balls, and provided that L is an interference in the axial direction of the end edge of the elastic member with respect to the wall surface of the seal groove, and P is the force for pressing the end edge of the elastic member on the wall surface based on the rigidity of the seal plate, P/L is in the range from 2.9 N/mm to 9.8 N/mm, and L is in the range from 1% to 3% of the diameter of the balls.

* * * * *